(12) United States Patent
Pathuri

(10) Patent No.: US 9,794,782 B2
(45) Date of Patent: Oct. 17, 2017

(54) SIMPLIFICATION OF ATTACHING DEVICES TO SECURED WIRELESS NETWORKS

(71) Applicant: BELKIN INTERNATIONAL, INC., Playa Vista, CA (US)

(72) Inventor: Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

(21) Appl. No.: 14/514,628

(22) Filed: Oct. 15, 2014

(65) Prior Publication Data

US 2016/0112870 A1    Apr. 21, 2016

(51) Int. Cl.

| | |
|---|---|
| *G06F 7/04* | (2006.01) |
| *G06F 15/16* | (2006.01) |
| *G06F 17/00* | (2006.01) |
| *H04L 29/06* | (2006.01) |
| *H04W 12/04* | (2009.01) |
| *H04L 12/24* | (2006.01) |
| *H04L 12/26* | (2006.01) |

(52) U.S. Cl.
CPC ........... *H04W 12/04* (2013.01); *H04L 63/104* (2013.01); *H04L 63/18* (2013.01); *H04L 41/0853* (2013.01); *H04L 43/0811* (2013.01); *H04L 43/0817* (2013.01); *H04L 63/0853* (2013.01); *H04L 63/107* (2013.01)

(58) Field of Classification Search
CPC ..... H04W 12/06; H04W 12/08; H04W 12/04; H04L 63/08; H04L 63/083; H04L 63/0853; H04L 63/107; H04L 63/0806; H04L 63/104; H04L 63/18
USPC .................. 709/203, 224; 713/155; 726/4, 5
See application file for complete search history.

(56) References Cited

U.S. PATENT DOCUMENTS

| | | | | |
|---|---|---|---|---|
| 8,375,430 | B2 * | 2/2013 | Grewal | ................. H04W 12/06 726/2 |
| 9,301,141 | B1 * | 3/2016 | Mincher | ............... H04L 63/062 |

* cited by examiner

*Primary Examiner* — Tae Kim
*Assistant Examiner* — Feliciano Mejia
(74) *Attorney, Agent, or Firm* — Kilpatrick Townsend & Stockton LLP

(57) ABSTRACT

Described herein are systems and methods for connecting devices to secured networks, such as secured wireless networks, by storing credentials for the network and passing the credentials to a new device, such as, for example, when the new device is attempting to connect to the secured network for the first time.

30 Claims, 23 Drawing Sheets

SIMPLIFICATION OF ATTACHING DEVICES TO SECURED WIRELESS NETWORKS

FIELD

The present disclosure generally relates to wireless control over electrical devices and sensors and to wireless communication between network devices. Specifically, various techniques and systems are provided for aiding connection of network devices to a network.

BACKGROUND

In order to attach wireless devices to a secured network, entry of a security key, passphrase or other credentials is typically required. Normally, a user will identify the wireless network or device to be connected to and then enter the required security credentials at a prompt and repeat this process for each device to be attached to the wireless network. Attaching wireless devices which do not include a user interface for entry of characters can be more complex, though security tokens can simplify this procedure. Further techniques for simplifying the connection of wireless devices to secured networks are needed.

SUMMARY

Described herein are systems and methods for connecting devices to secured networks, such as secured wireless networks, by storing security credentials for the network and passing the security credentials to a new device, such as, for example, when the new device is attempting to connect to the secured network for the first time.

Storing the security credentials and transmitting them to a new device advantageously simplifies the connection of the new device to the secured network, as additional user input is not required in order for the new device to connect to the network. The systems and methods described herein optionally incorporate protocols for ensuring security is maintained, such as by verifying an identity of a new device before the security credentials are sent to the new device, or by allowing a user to specifically authorize sending the security credentials to the new device.

In a first aspect, provided are method, such as computer implemented methods. In an embodiment, a method of this aspect comprises the steps of receiving, such as at a computing device, network credentials for connecting to a network; connecting the computing device to the network using the network credentials; storing the network credentials; establishing a communications link that facilitates communication between devices, such as, for example, a communications link for off-network communication; and transmitting the network credentials using the communications link. In embodiments, receiving the network credentials at a new device facilitates communication between the new device and one or more devices on the network. For example, in one embodiment, receiving the network credentials at a new device facilitates connection of the new device to the network using the network credentials.

In various embodiment, the network credentials can be stored in any of a variety of locations, including at one or more network devices or at one or more locations in the cloud, such as at a cloud server or other Internet connected server for retrieval and passing to a newly connected device. In general, however, each network device which uses the network credentials to connect to the network will store the network credentials, such as to allow the network device to reconnect to the network upon loss of power. In a specific embodiment, the computing device includes non-transitory memory, which stores the network credentials. Optionally, methods of this aspect further include determining a location where the network credentials are store, with the step of transmitting the network credentials including facilitating communication from the location where the network credentials are stored. For example, in embodiments, the network credentials stored in the non-transitory memory are retrieved and/or transmitted from the non-transitory memory. Optionally, the step of storing the network credentials includes transmitting the network credentials over the network. In one specific embodiment, the network credentials are encrypting prior to transmission.

The systems and methods described herein are optionally configured to restrict sharing of the locally stored network credentials with new devices unless specifically authorized to do so. For example, in one embodiment, a notification is generated to alert a user that the network credentials are being shared or have already been shared with a new device. Optionally, a notification can request authorization from a user to share the network credentials, either automatically or with further notifications that the network credentials have been shared. In some embodiments, the authorization to share the network credentials can be limited, such as to allow only the sharing of the network credentials with a single device or to allow sharing only during a specific time period or to revoke the authorization to share the network credentials altogether. In a specific embodiment, a method of this aspect further comprises generating a notification. For example in one embodiment, a method of this aspect comprises transmitting a notification, such as before transmitting the network credentials or after transmitting the network credentials. In this way, a user is optionally alerted to the fact that the network credentials have been or are going to be shared.

Optionally, a user can intervene to authorize or restrict the sharing of the network credentials. For example, in one embodiment, the notification requests authorization for transmitting the network credentials. In a specific embodiment, a method of this aspect further comprises detecting input corresponding to authorization or to transmit the network credentials or deauthorization from sharing the network credentials. Optionally, the input limits the authorization.

In embodiments, a variety of network credentials types and configurations are useful with the methods and devices described herein. For example, in embodiments, the network credentials comprise one or more of a username, a password, security protocol, a security key, a security passphrase, an encryption protocol, an encryption key, a wireless transmission frequency, a wireless transmission protocol, a service set identifier, a media access control address, a wireless profile, a modulation scheme, a network topology, and the like.

In embodiments, sharing of the network credentials is automatically authorized between devices of a single manufacturer or between devices of a single product line. For example, in some embodiments, a device can exchange device identifiers or security keys with a new device to verify the new device is authorized for sharing the network credentials. In embodiments, in the event a new device cannot be authorized in this fashion, a user can optionally verify the new device, such as by providing input authorizing the new device. Optionally, a method of this aspect further comprises verifying the new device prior to transmitting the network credentials. In a specific embodiment, verifying includes detecting input associated with an access device. In a specific embodiment, verifying includes facilitating comparison of a device identifier for the new device with one or more reference device identifiers. In some embodiments, verifying comprises transmitting a first security key and/or receiving a second security key.

In certain circumstances it is desirable to change the network credentials used for connecting to the network. In embodiments, updated network credentials can be input or stored by a device and passed to all or a subset of other devices on the network to allow continued connection to the network upon changing the security credentials. In one embodiment, such a configuration is facilitated by having the gateway or access point to which network devices wirelessly connect share the updated network credentials prior to changing the network credentials, such that upon changing the network credentials at the gateway or access point, the network devices already have already received the updated network credentials and reconnection to the gateway or access point upon changing the network credentials is seamless. In some embodiments, the network credentials stored by a network device can become corrupted or lost and resending the network credentials can be automatically authorized in advance, reducing connection down time and simplifying the requirements for reconnecting the device to the network. In a specific embodiment, a method of this aspect further comprise storing updated network credentials; and transmitting the updated network credentials. Optionally, the methods of this aspect comprise facilitating connection of the new device to the network using the network credentials.

In another aspect, provided herein are systems, such as systems for performing the methods described herein. A specific system embodiment comprises one or more data processors; and a non-transitory computer-readable storage medium containing instructions which when executed on the one or more data processors, cause the one or more data processors to perform operations including: receiving network credentials for connecting to a network; connecting to the network using the network credentials; storing the network credentials; establishing a communications link for off-network communication; and transmitting the network credentials using the communications link. In an embodiment, receiving the network credentials at a new device facilitates connection of the new device to the network using the network credentials.

In a specific embodiment, the system further comprises: a non-transitory memory and the operations further include storing the network credentials in the non-transitory memory; and transmitting the network credentials from the non-transitory memory. In an embodiment, for example, the operations further comprise determining a location where the network credentials are stored, wherein transmitting the network credentials includes facilitating communication from the location where the network credentials are stored.

Optionally, the systems of some embodiments include instructions on the non-transitory computer-readable storage medium that, when executed on the one or more data processors, cause one or more data processors to perform operations further including: transmitting a notification, wherein the notification requests authorization for transmitting the network credentials. In one embodiment, the operations further comprise detecting input corresponding to authorization to transmit the network credentials. Optionally, the input limits the authorization.

In some embodiment, the system includes instructions on the non-transitory computer-readable storage medium that, when executed on the one or more data processors, cause one or more data processors to perform operations further including: verifying the new device prior to transmitting the network credentials. As described above, such a configuration is useful when devices from a single manufacturer or product line are to automatically share network credentials. Optionally, verifying includes detecting input associated with an access device. Optionally, verifying includes facilitating comparison of a device identifier for the new device with one or more reference device identifiers. In an exemplary embodiment, the operations further comprise facilitating connection of the new device to the network using the network credentials.

In another aspect, provided is a computer-program product tangibly embodied in a non-transitory machine-readable storage medium, including instructions configured to cause a computing device to receive network credentials for connecting to a network; connect to the network using the network credentials; store the network credentials; establish a communications link for off-network communication; and transmit the network credentials using the communications link, wherein when the network credentials are received at a new device the computing device facilitates connection of the new device to the network using the network credentials.

In a specific embodiment, the computing device includes non-transitory memory. Optionally, the instructions are configured to cause the computing device to store the network credentials in the non-transitory memory and transmit the network credentials from the non-transitory memory. In an embodiment, the instructions further include causing the computing device to: determine a location where the network credentials are stored; and facilitate communication from the location where the network credentials are stored when the computing device transmits the network credentials using the communications link.

In some embodiments, a computer-program product further includes instructions configured to cause the computing device to: generate a notification requesting authorization to transmit the network credentials. For example, optionally, the computer-program product further includes instructions configured to cause the computing device to: detect input corresponding to authorization to transmit the network credentials. Optionally, the input limits the authorization.

In certain embodiments, a computer-program product further includes instructions configured to cause the computing device to: verify the new device before the computing device transmits the network credentials. Optionally, the instructions configured to cause the computing device to verify the new device cause the computing device to detect input associated with an access device or compare a device identifier for the new device with one or more reference device identifiers. In some embodiments, the computer-program product further includes instructions configured to cause the computing device to: facilitate connection of the new device to the network using the network credentials.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
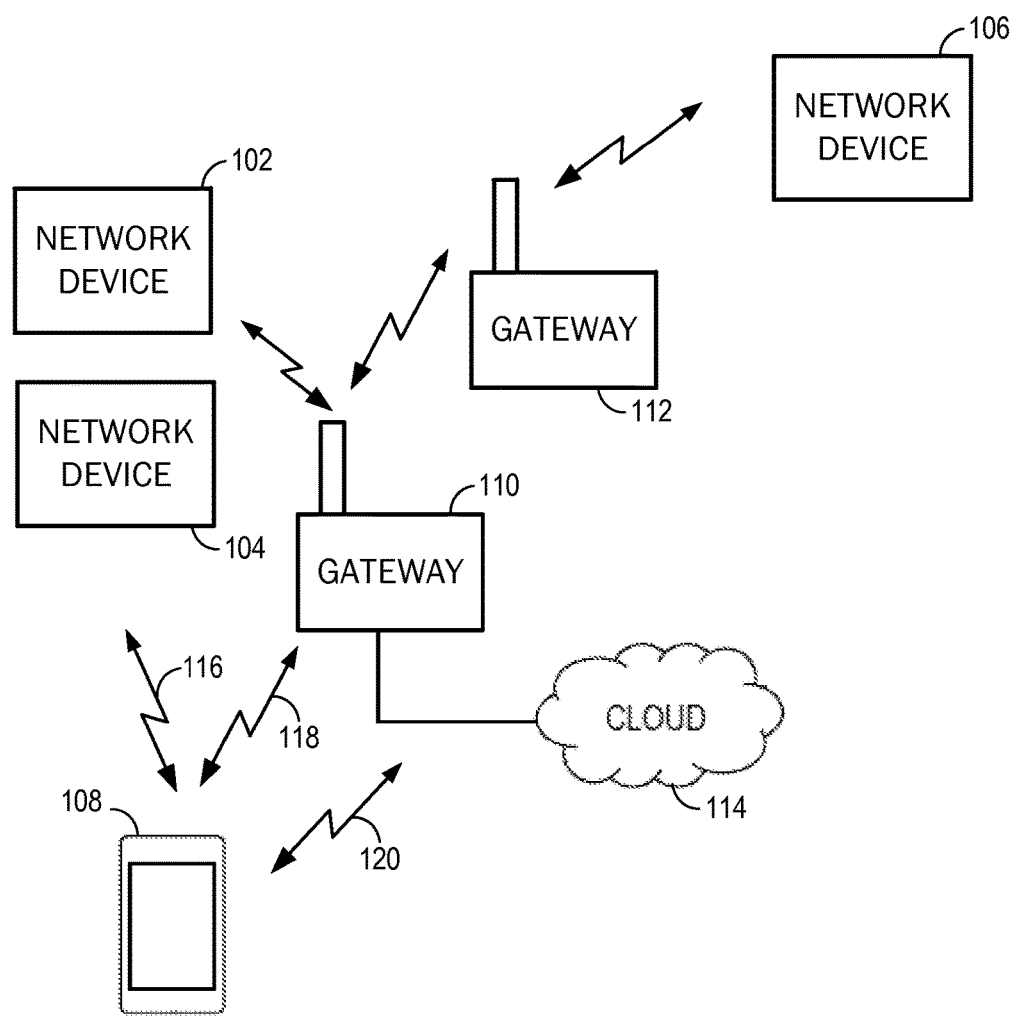
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
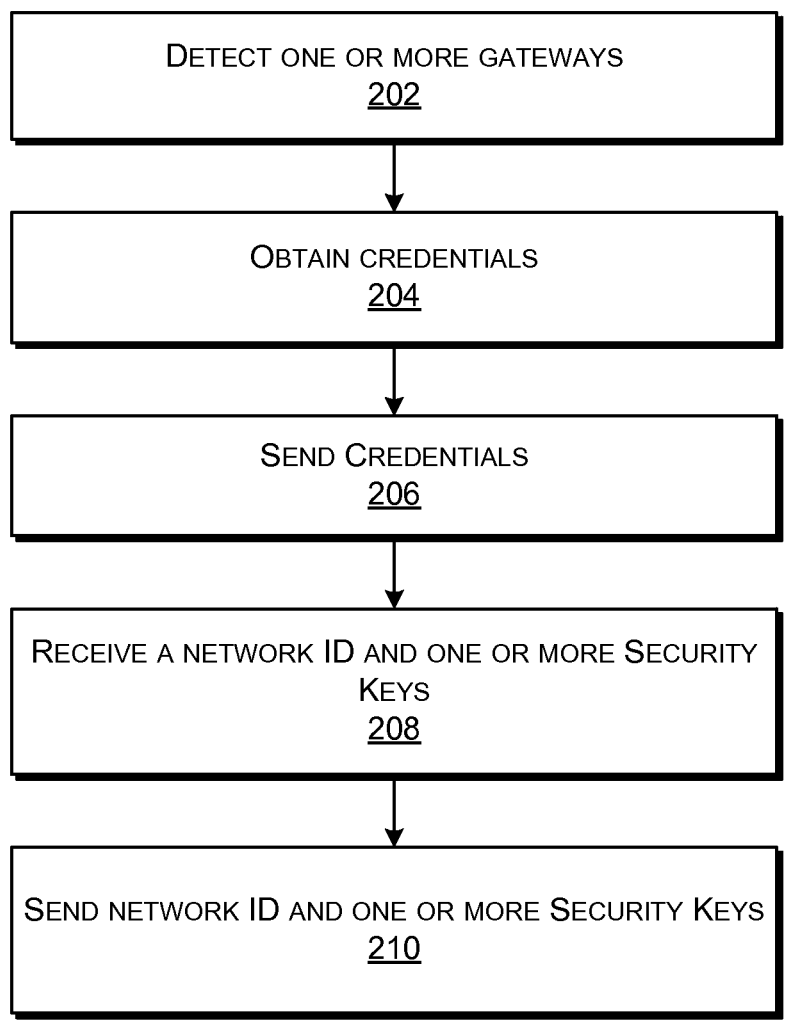
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and Expiration-Time terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
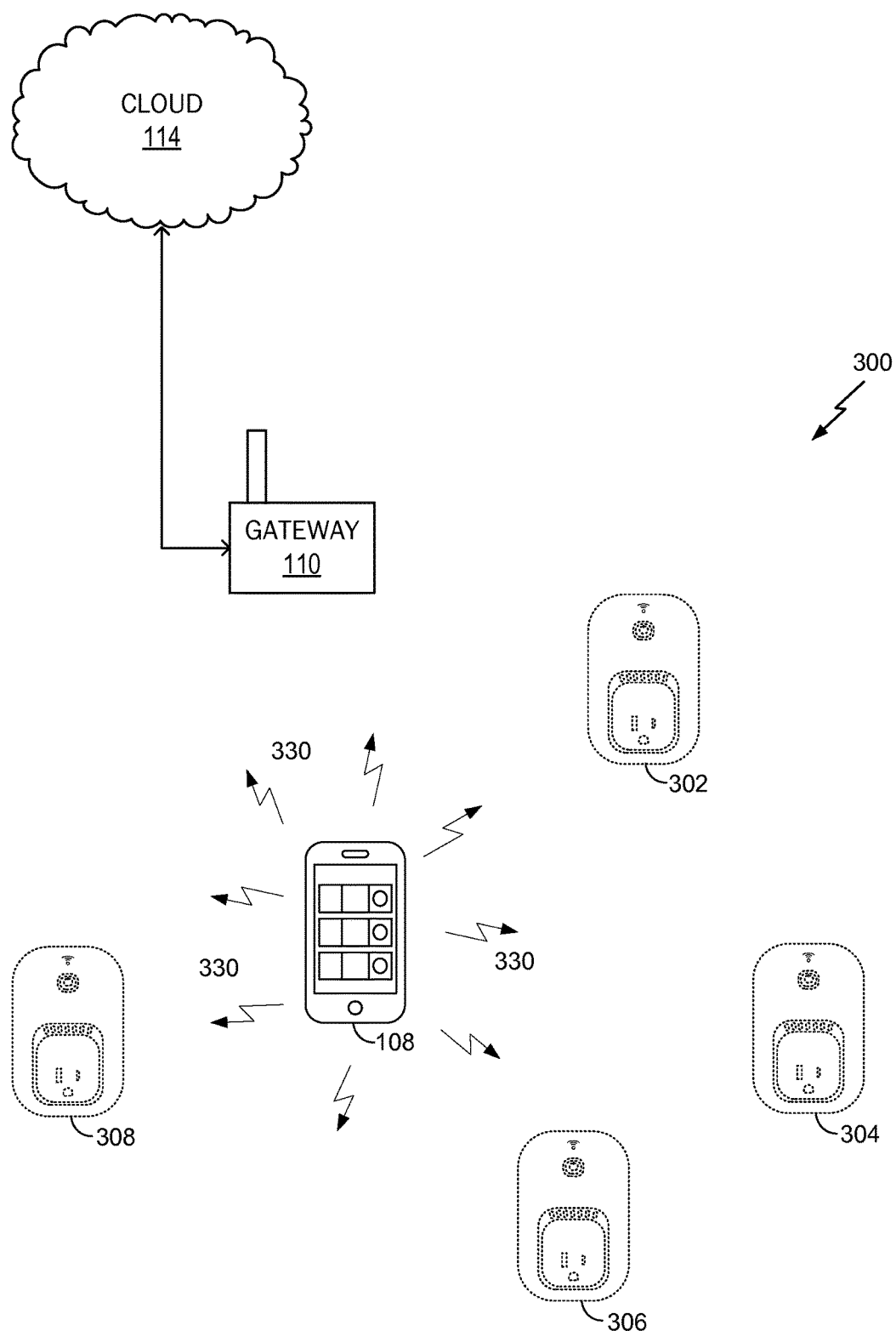
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
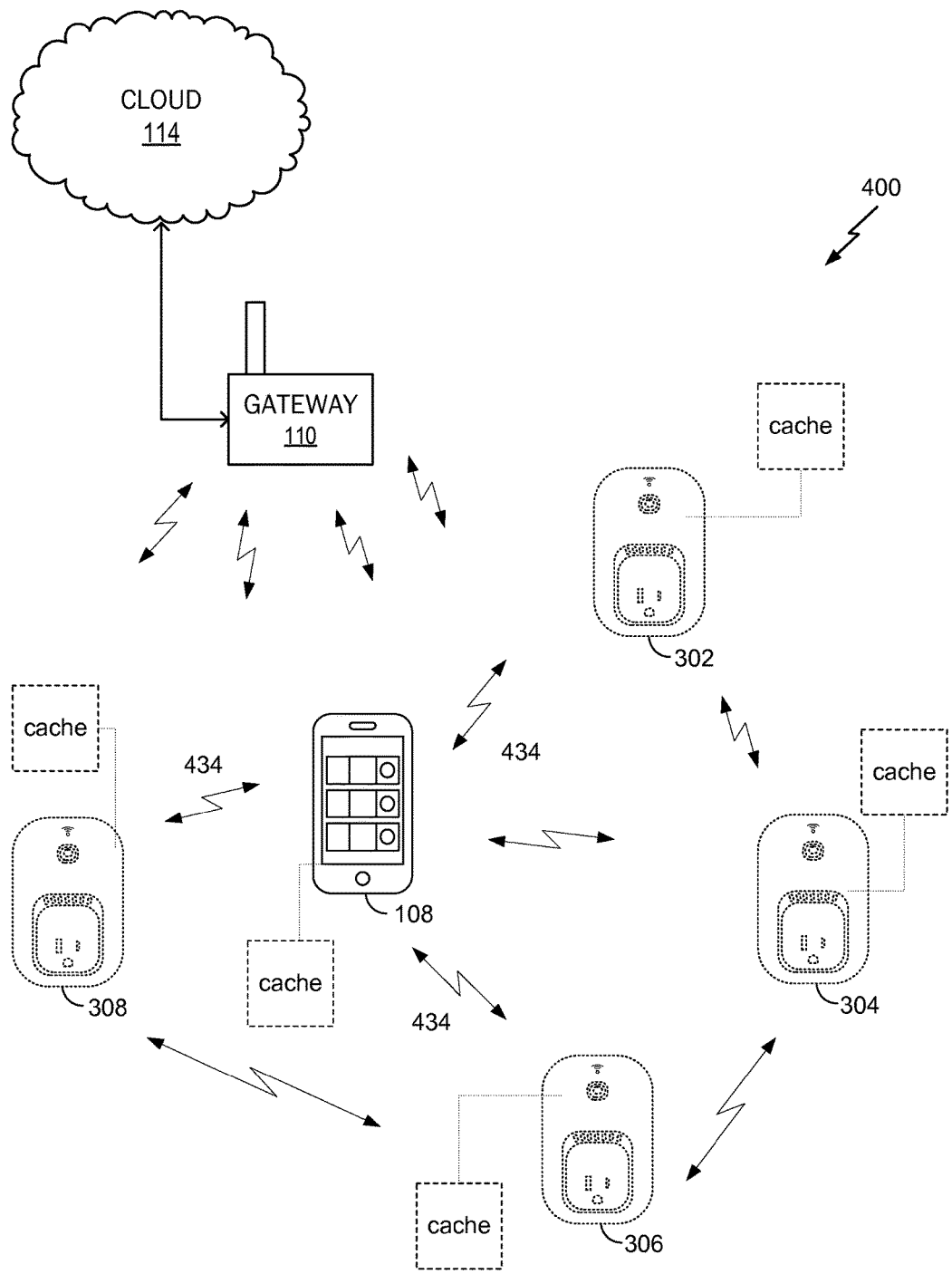
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
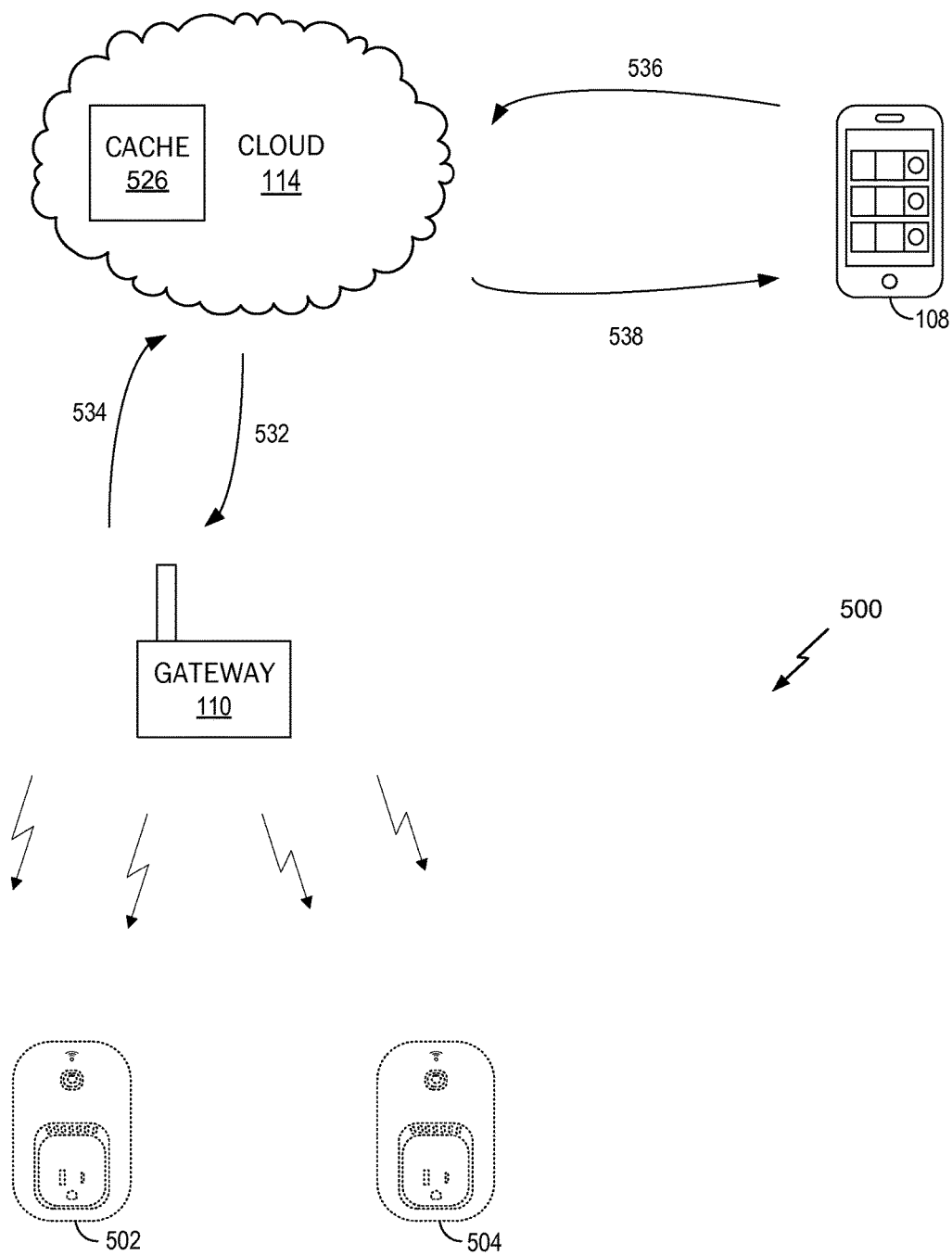
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
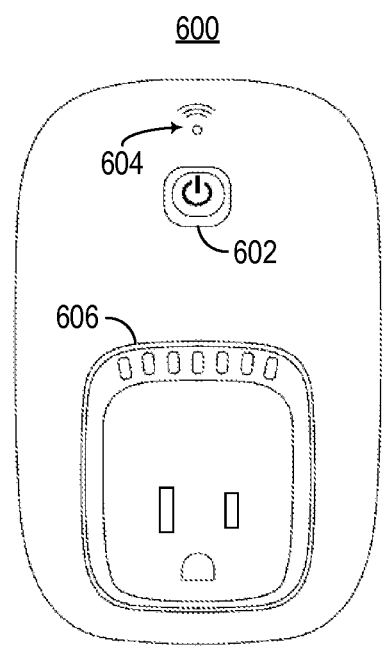
FIG. 6 is an illustration of an example of a front view of a network device, in accordance with an embodiment.
Figure 7:
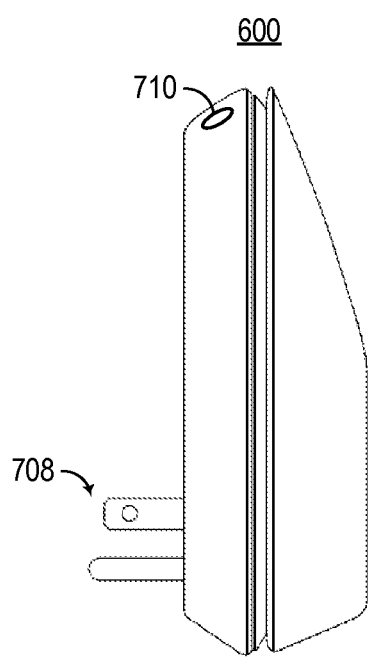
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes a power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
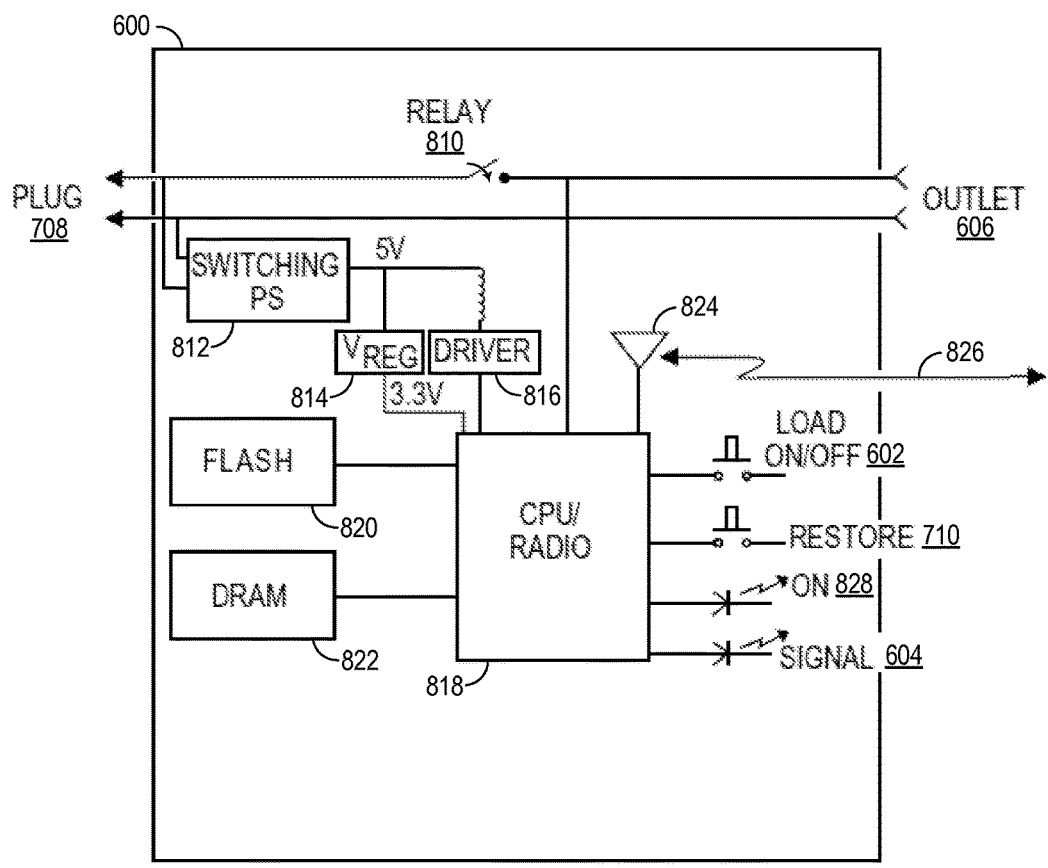
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822.

The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 600 and/or might take the form of source and/or installable code, which, upon compilation and/or installation on the network device 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
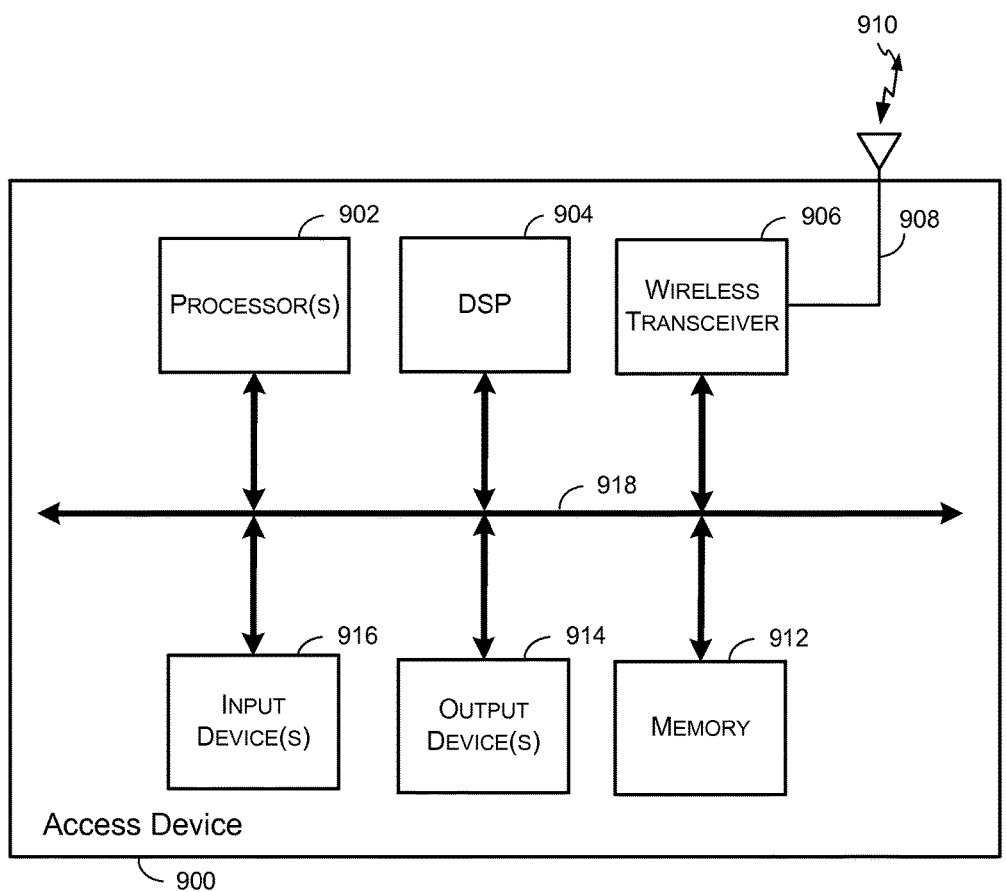
FIG. 9 is a block diagram illustrating an example of an access device, in accordance with some embodiments.

FIG. 9 illustrates an example of an access device 900. The access device 900 may include any human-to-machine interface with network connection capability that allows access to a network. For example, the access device 900 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 900 includes hardware elements that can be electrically coupled via a bus 918 (or may otherwise be in communication, as appropriate). In one embodiment, the bus 918 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like); one or more input devices 916, which can include without limitation a camera, a mouse, a keyboard, a touch sensitive screen, a touch pad, a keypad, and/or the like; and one or more output devices 914, which can include, without limitation, a display, a printer, and/or the like.

The access device 900 may include one or more wireless transceivers 906 connected to the bus 918. The wireless transceiver 906 may be operable to receive wireless signals (e.g., signal 910) via antenna 908. The wireless signal 910 may be transmitted via a wireless network.

In some embodiments, the wireless network may be any wireless network including, but not limited to, a wireless local area network (e.g., local area network 100), such as WiFi, a Personal Access Network (PAN), such as Bluetooth®, Zigbee®, or UWB, or a wide area network, such as a cellular network (e.g., a GSM, WCDMA, LTE, CDMA2000 network), a cloud network, the Internet or other network. Wireless transceiver 906 may be configured to receive various radio frequency (RF) signals (e.g., signal 910) via antenna 908 from one or more gateways, network devices, other access devices, cloud networks, and/or the like. Access device 900 may also be configured to decode and/or decrypt, via the DSP 904 and/or processor(s) 902, various signals received from one or more gateways, network devices, other access devices, cloud networks, and/or the like.

The access device 900 may further include (and/or be in communication with) one or more non-transitory machine-readable storage mediums or storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 912, such as RAM, ROM, FLASH, or disc drive, and executed by processor(s) 902 or DSP 904. The access device 900 can also comprise software elements (e.g., located within the memory 912), including, for example, an operating system, device drivers, executable libraries, and/or other code, such as one or more application programs, which may comprise computer programs implementing various functions. Memory 912 may be a non-transitory machine-readable storage medium, processor-readable memory, and/or a computer-readable memory that stores the one or more computer-program products configured to cause the processor(s) 902 and/or DSP 904 to perform the various functions. In other embodiments, the various functions described may be performed in hardware.

Figure 10:
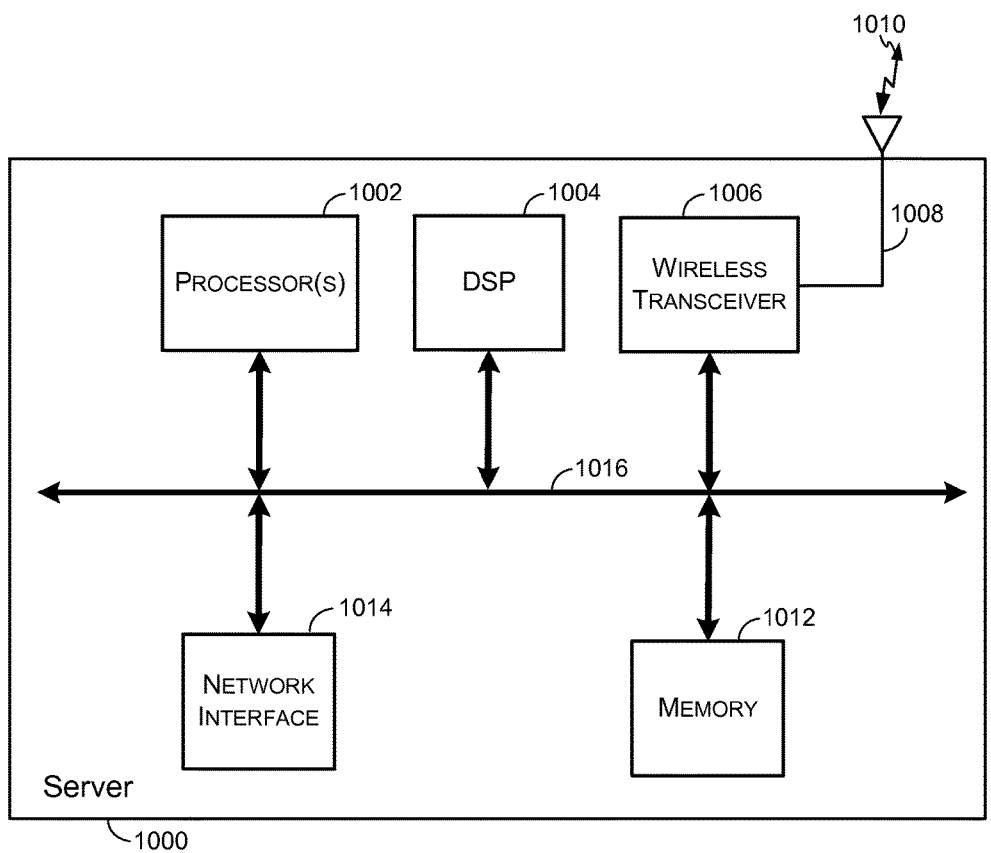
FIG. 10 is a block diagram illustrating an example of a server, in accordance with some embodiments.

FIG. 10 illustrates an example of a server 1000. The server 1000 includes hardware elements that can be electrically coupled via a bus 1016 (or may otherwise be in communication, as appropriate). In one embodiment, the bus 1016 can be used for the processor(s) 1002 to communicate between cores and/or with the memory 1012. The hardware elements may include one or more processors 1002, including without limitation one or more general-purpose processors and/or one or more special-purpose processors (such as digital signal processing chips, graphics acceleration processors, and/or the like), memory 1012, DSP 1004, a wireless transceiver 1006, a bus 1016, and antenna 1008. Furthermore, in addition to the wireless transceiver 1006, server 1000 can further include a network interface 1014 to communicate with a network (e.g., a local area network, a network of a preferred carrier, Internet, etc.).

The server 1000 may further include (and/or be in communication with) one or more non-transitory machine-readable storage mediums or storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1012. The server 1000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1012 may be a non-transitory machine-readable storage medium, processor-readable memory, and/or a computer-readable memory that stores the one or more computer-program products configured to cause the processor(s) 1002 to perform the functions described. In other embodiments, one or more of the functions described may be performed in hardware.

A set of these instructions and/or code might be stored on a non-transitory machine-readable storage medium, such as the memory 1012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1000 and/or might take the form of source and/or installable code, which, upon compilation and/or installation on the server 1000 (e.g., using any of a variety of generally available compilers, installation programs, compression/decompression utilities, etc.) then takes the form of executable code.

Figure 11:
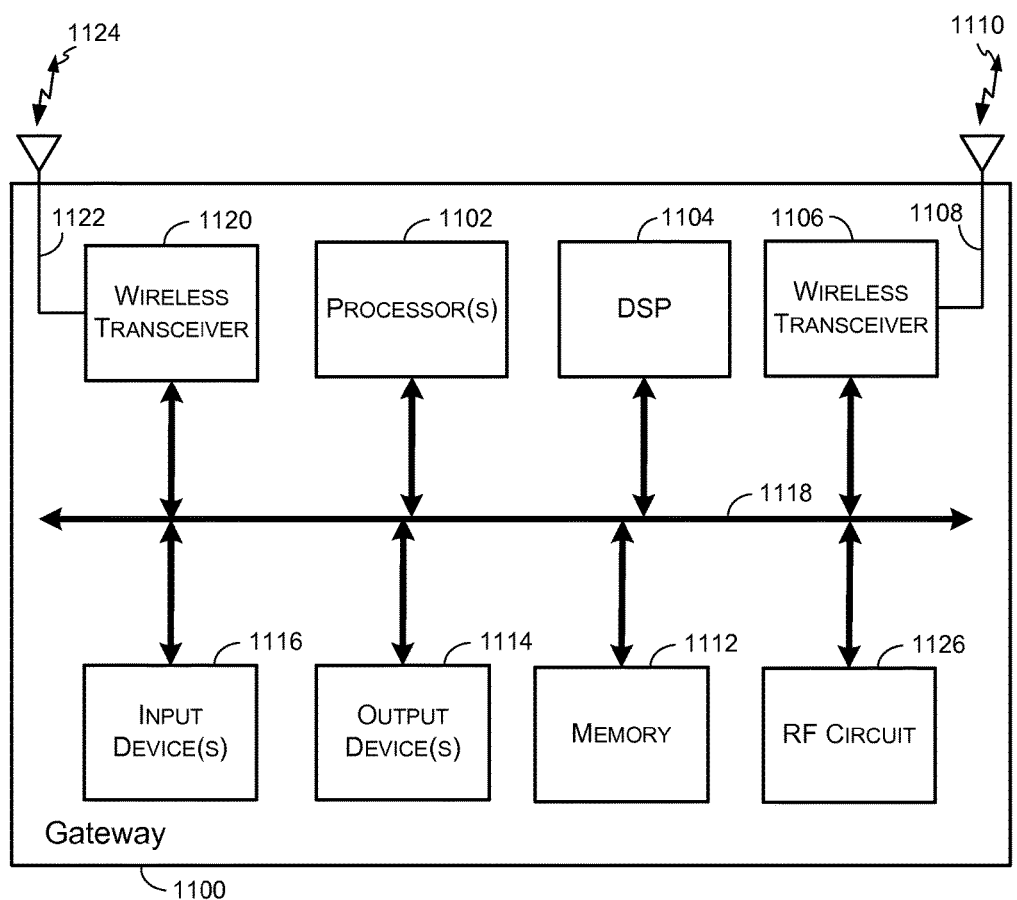
FIG. 11 is a block diagram illustrating an example of a gateway, in accordance with some embodiments.

FIG. 11 illustrates an example of a gateway 1100. The gateway 1100 may include a range extending device, a router, an access point, a modem, and/or any other device that provides network access among one or more computing devices and/or external networks. For example, the gateway 1100 may include a router gateway with access point and router functionality, and may further include an Ethernet switch and/or a modem. As another example, the gateway 1100 may include a range extending gateway that may be used to improve signal range and strength within a network by taking an existing signal from another gateway (e.g., a router gateway, an access point, or the like) and rebroadcasting the signal to create a second logical network.

The gateway 1100 includes hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation one or more buttons, a keyboard, a keypad, a touch sensitive screen, a touch pad, and/or the like; and one or more output devices 1114, which can include, without limitation, a display, light or sound indicators, and/or the like.

The gateway 1100 may include one or more wireless transceivers 1106 and 1120 connected to the bus 1118. The wireless transceiver 1106 may be operable to receive wireless signals (e.g., a wireless signal 1110) via an antenna 1108. The wireless transceivers 1120 may be operable to receive wireless signals (e.g., a wireless signal 1114) via an antenna 1122. The wireless transceivers 1106 and 1120 may each include a WiFi transceiver radio designed to transmit and receive signals using frequencies of a specific frequency band, which may be referred to herein as "WiFi circuits." For example, wireless transceiver 1106 may include a 2.4 GHz WiFi circuit, and wireless transceiver 1120 may include a 5 GHz WiFi circuit. Accordingly, the gateway 1100 may include a single WiFi circuit for a first WiFi frequency band, and a single WiFi circuit for a second WiFi frequency band. In some embodiments, the gateway 1100 may include multiple wireless transceivers (not shown) for each available frequency band. The antennas 1108 and 1122 may include multiple band antennas that can transmit and/or receive signals over different frequency bands.

The gateway 1100 may further include radio frequency (RF) circuit 1126. In some embodiments, the wireless transceivers 1106 and 1120 may be integrated with or coupled to the RF circuit 1126 so that the RF circuit 1126 includes the wireless transceivers 1106 and 1120. In some embodiments, the wireless transceivers 1106 and 1120 and the RF circuit 1126 are separate components. The RF circuit 1126 may include a RF amplifier that may amplify signals received over antennas 1108 and 1122. The RF circuit 1126 may also include a power controller that may be used to adjust signal amplification by the RF amplifier. The power controller may be implemented using hardware, firmware, software, or any combination thereof.

The wireless signals 1110 and 1124 may be transmitted via a wireless network. In some embodiments, the wireless network may be any wireless network including, but not limited to, a wireless local area network (e.g., local area network 100), such as WiFi™, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceivers 1106 and 1120 may be configured to receive various radio frequency (RF) signals (e.g., signals 1110 and 1124) via antennas 1108 and 1124, respectively, from one or more other gateways, access devices, network devices, cloud networks, and/or the like. Gateway 1100 may also be configured to decode and/or decrypt, via the DSP 1104 and/or processor(s) 1102, various signals received from one or more gateways, network devices, cloud networks, and/or the like.

The gateway 1100 may include a power supply (not shown) that can power the various components of the gateway 1100. The power supply may include a switch-mode power supply, a linear power supply, a push-pull power supply, or any other suitable type of power supply. In some embodiments, the gateway 1100 may include multiple power supplies. For example, a switch-mode power supply may be used to condition input power, and a linear power supply may be used to power the RF circuit 1126. The power supply may be configured to operate over various ranges of appropriate input voltages.

The gateway 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102 or DSP 1104. The gateway 1100 can also comprise software elements (e.g., located within the memory 1112), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2, 13, 14, 16, 17, 18, 20, 21 and 23 may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2, 13, 14, 16, 17, 18, 20, 21 and 23. The memory 1112 may be a non-transitory machine-readable storage medium, processor-readable memory, and/or a computer-readable memory that stores the one or more computer-program products configured to cause the processor(s) 1102 to perform the functions described. In other embodiments, one or more of the functions described may be performed in hardware.

A set of these instructions and/or code might be stored on a non-transitory machine-readable storage medium, such as the memory 1112. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1100 and/or might take the form of source and/or installable code, which, upon compilation and/or installation on the gateway 1100 (e.g., using any of a variety of generally available compilers, installation programs, compression/decompression utilities, etc.) then takes the form of executable code.

Figure 12:
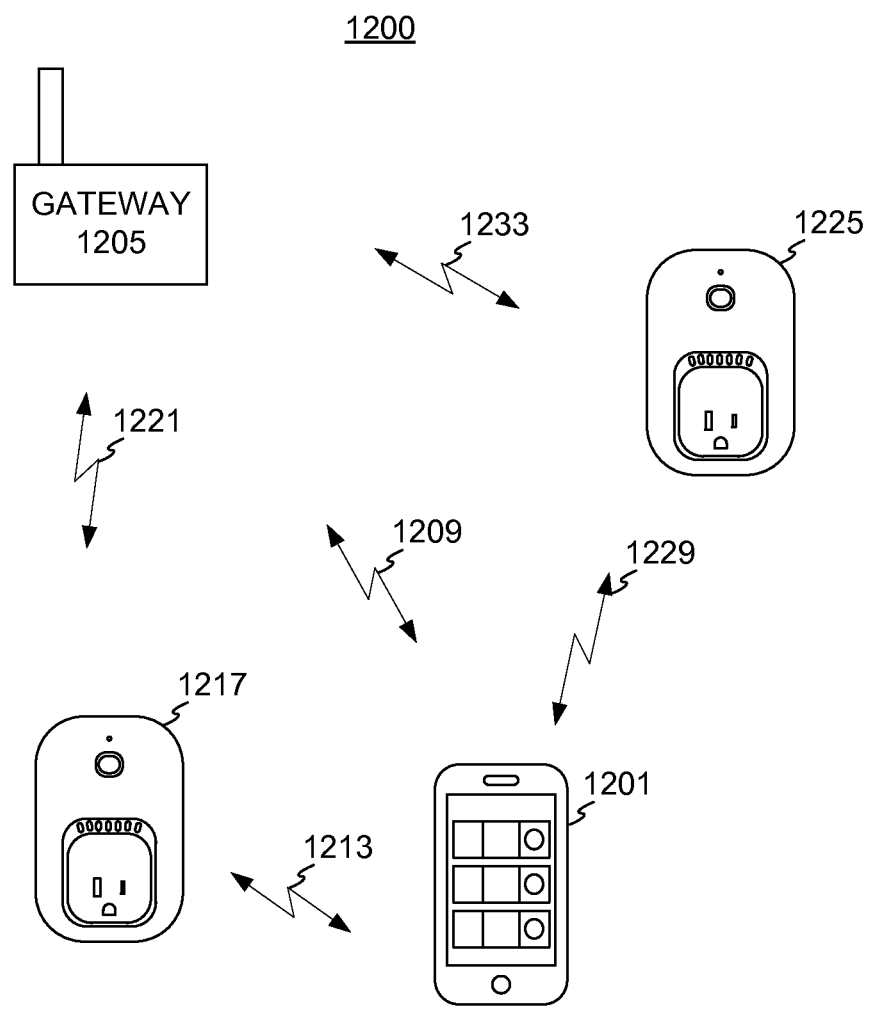
FIG. 12 is an illustration of an example of a network environment, in accordance with some embodiments.

FIG. 12 illustrates an example embodiment of a local area network 1200. Here, access device 1201 connects to gateway 1205 over wireless link 1209. As may be customary for some embodiments, gateway 1205 provides for wireless connections to multiple network devices in a local area network. For example, gateway 1205 may broadcast a security set identifier (SSID) for a wireless network, which may be detected by various wireless network devices to establish the presence of the wireless network. Connection to the wireless network may require one or more network credentials, such as a username, a password, a security protocol, a security key, an encryption protocol, an encryption key, a wireless transmission frequency, a wireless transmission protocol, a service set identifier, a media access control address, a wireless profile, a modulation scheme, a network topology, and the like. As necessary for establishing the wireless link, network credentials are provided to access device 1201 for establishing wireless link 1209 with gateway 1205.

As new devices are added to the local area network 1200, embodiments provide simplification of the procedures for connecting the new devices to the local area network 1200. For example, a communications link 1213 can be initially established between access device 1201 and network device 1217 for off-network communication between access device 1201 and network device 1217, separate from any network link to the gateway 1205. Such a technique advantageously allows passing network credentials to network device 1217 for connection to the local area network 1200 when network device 1217 has no user facing inputs to facilitate input of the network credentials. In addition, access device 1201 can store the network credentials and automatically send the network credentials to network device 1217 using a network link separate from the connection to the gateway 1205, thus preventing a user from having to enter the network credentials each time a new device is added. Alternatively or additionally, the network credentials can be stored at one or more other locations, such as by a network device, by a cloud server, etc. After receiving the network credentials, network device 1217 can then use the network credentials to connect to gateway 1205 and establish a network link 1221. Similarly, when it is desired to add network device 1225 to local area network 1200, a communications link 1229 is established between access device 1201 and network device 1225, such as to facilitate transmission of the network credentials to the network device 1229. After the network credentials are received, network device 1229 can then connect to gateway 1205 and establish network link 1233.

Figure 13:
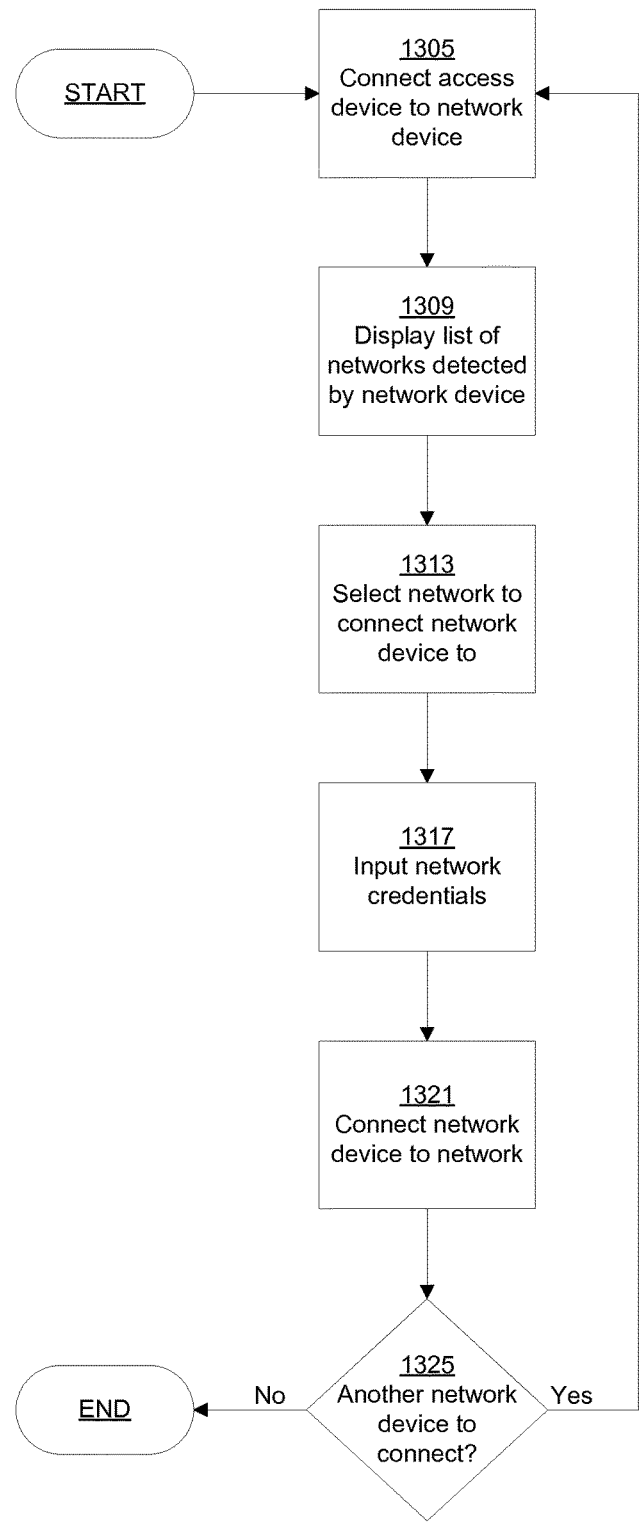
FIG. 13 provides an overview of a method for connecting network devices to a network.

FIG. 13 provides an overview of a first method embodiment for establishing a local area network, such as local area network 1200. First, the access device is connected to a network device (1305), such as a new network device to be added to the local area network, to allow off-network communication between the access device and the network device. The access device then displays a list of networks detected by the network device (1309), upon which the desired network is selected (1313). The network credentials are then input to the access device (1317), which then transmits the network credentials to the network device. The network device then connects to the network using the network credentials (1321). If there is another network device to connect (1325), the process is then repeated. Such a method may be cumbersome for a user, however, as the network credentials need to be entered each time a new network device is to be added to the network.

Figure 14:
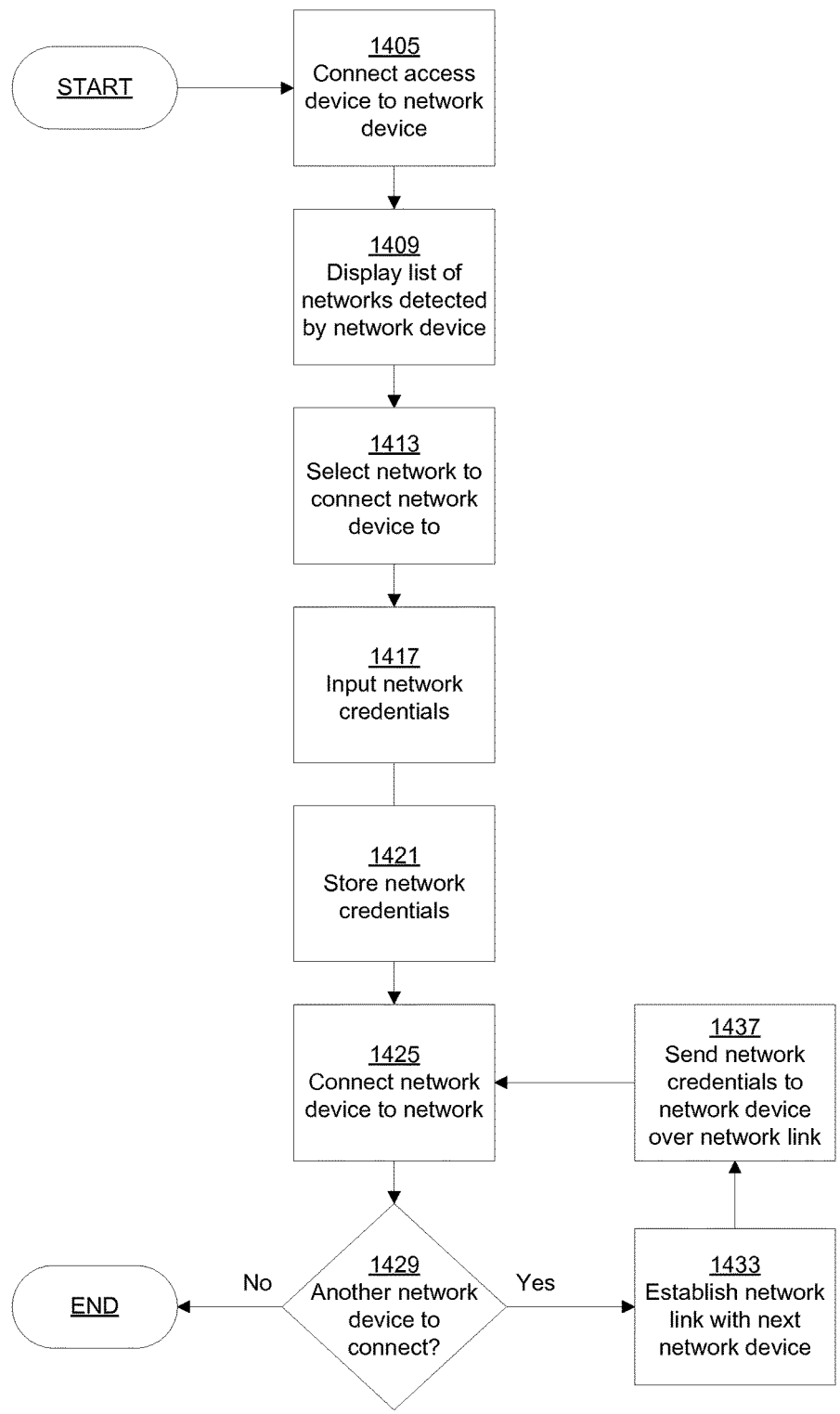
FIG. 14 provides an overview of a method for connecting network devices to a network, in accordance with some embodiments.

FIG. 14 provides an overview of another method embodiment for establishing a local area network, such as local area network 1200. Similar to the method shown in FIG. 13, the access device is first connected to a network device to be added to the local area network (1405), to allow communication between the access device and the network device using an off-network link. The access device then displays a list of networks detected by the network device (1409), upon which the desired network is selected (1413). The network credentials are then input (1417), and stored (1421). The network credentials are then transmitted to the network device using the off-network link and, after receipt, the network device connects to the network using the network credentials (1425). This method simplifies connection of new devices, due to the storing of the network credentials. If there is another network device (1429), another off-network link can be established with the next network device (1433) and the network credentials can be retrieved from memory and passed to next network device (1437) to allow it to connect to the network (1425). Advantageously, such a method requires only a single entry of network credentials, which are stored in a memory device and retrieved each time a new network device is to be added to the network.

Figure 15:
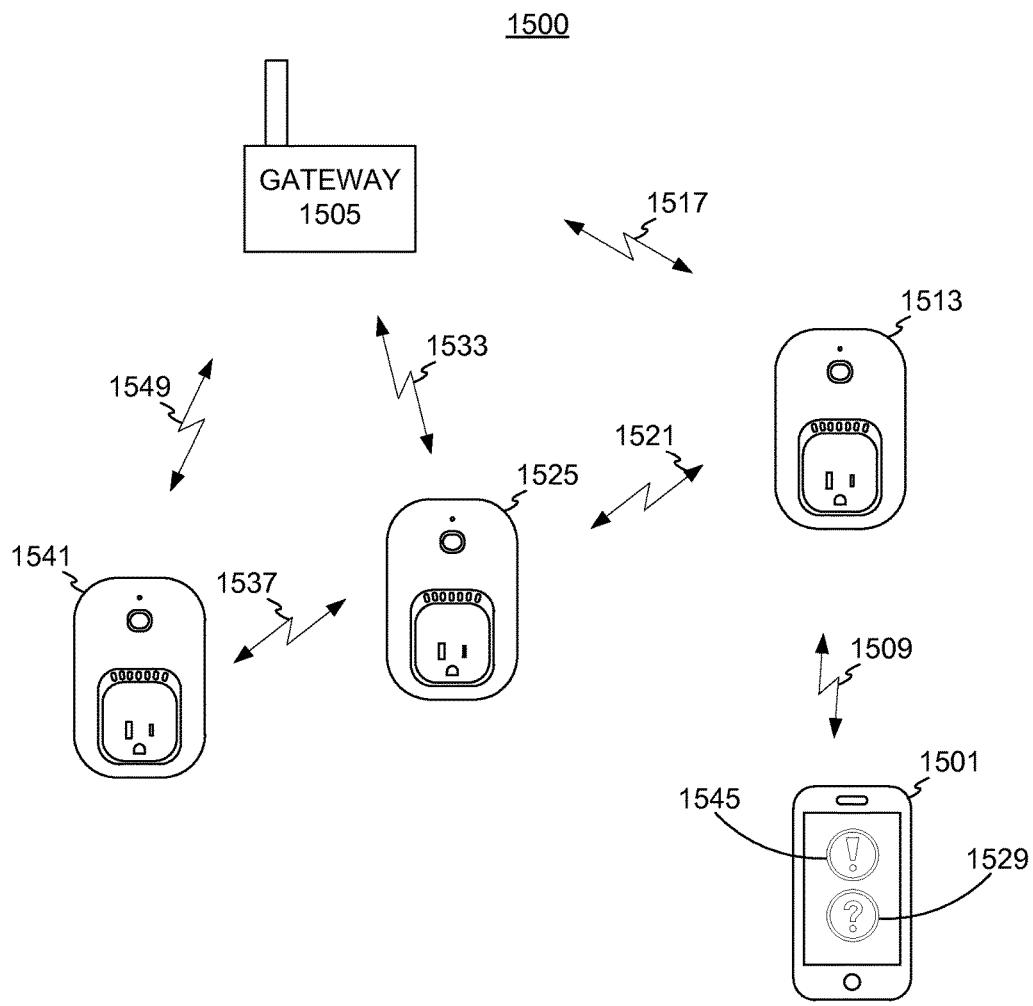
FIG. 15 is an illustration of an example of a network environment, in accordance with some embodiments.

FIG. 15 illustrates an example embodiment of a local area network 1500. Here, an access device 1501 connects to network device 1513 over off-network wireless link 1509. If the network credentials for connection to gateway 1505 are stored by or accessible to access device 1501, they are be passed to network device 1513 over off-network wireless link 1509. If the network credentials for connection to gateway 1505 are not stored by or accessible to access device 1501, a user can enter the network credentials, which are then passed to network device 1513 over wireless link 1509 and optionally stored. After receiving the network credentials, network device 1513 establishes a wireless connection 1517 with gateway 1505. In the embodiment shown, for adding network device 1525 to local area network 1500, an off-network wireless link 1521 is established between network device 1513 and network device 1525, and a notification 1529 is generated and displayed on access device 1501, such as to request authorization to share the stored network credentials. After the stored network credentials are transmitted to network device 1525 over off-network wireless link 1521, network device 1525 establishes wireless connection 1533 with gateway 1505. In the embodiment shown, for adding network device 1541 to local area network 1500, an off-network wireless link 1537 is established with network device 1541, shown here as between network device 1541 and network device 1525. A notification 1545 is generated and displayed on access device 1501, such as to notify that the stored network credentials are being automatically shared with network device 1541. After the stored network credentials are transmitted to network device 1541 over off-network wireless link 1537, network device 1541 is connected to the local area network by establishing a wireless connection 1549 with gateway 1505 using the network credentials.

Figure 16:
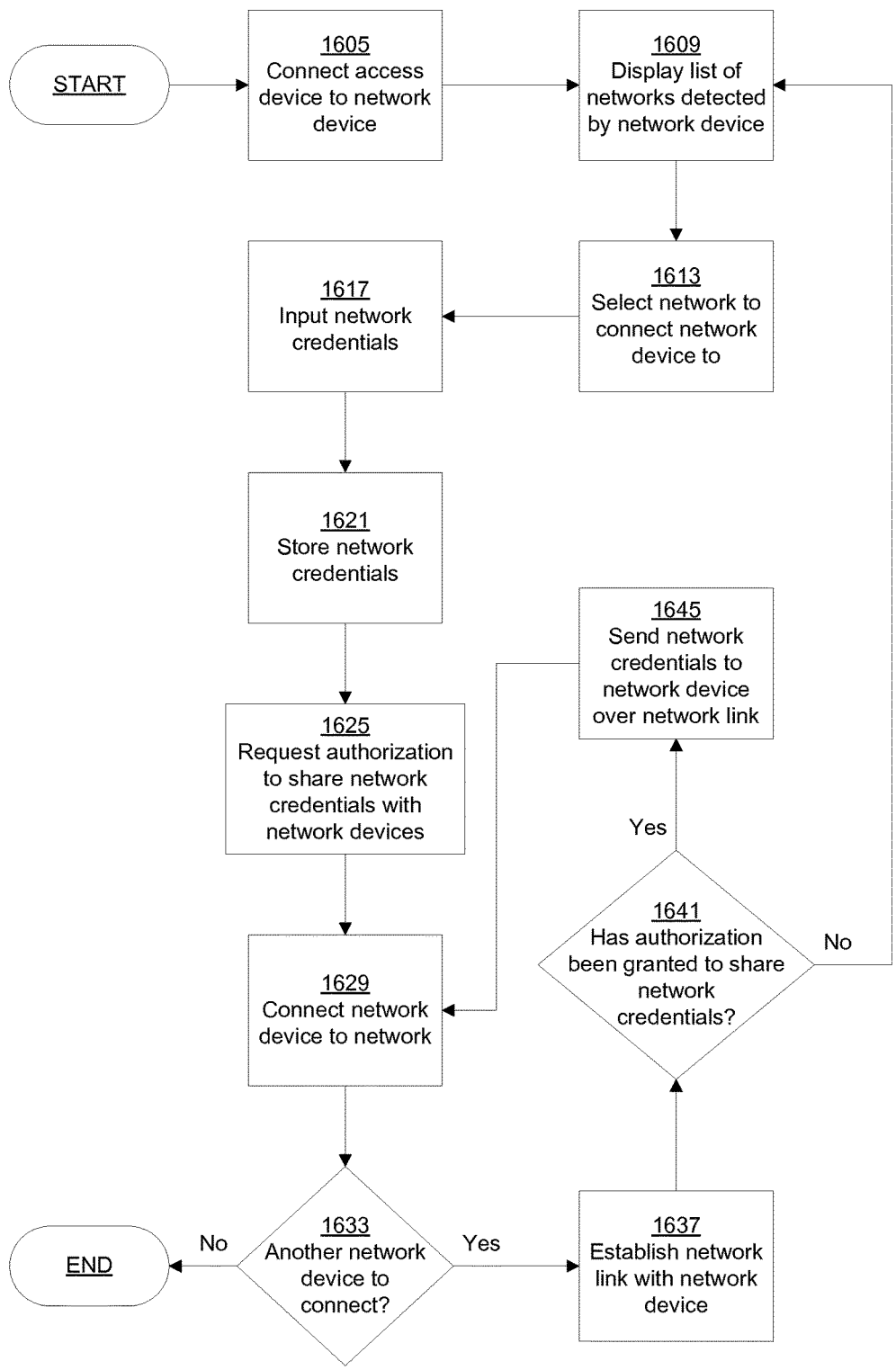
FIG. 16 provides an overview of a method for connecting network devices to a network, in accordance with some embodiments.

FIG. 16 provides an overview of another method embodiment for establishing a local area network, such as local area network 1500. In this embodiment, the network credentials are automatically shared with new devices if authorization to do so is received. First, the access device is connected to a network device to be added to the local area network (1605) to allow communication between the access device and the network device using an off-network link. The access device then displays a list of network detected by the network device (1609), upon which the desired network is selected (1613). The network credentials are then input (1617), and stored (1621). Authorization is requested for sharing the network credentials with one or more network devices (1625). The network credentials are then transmitted to the network device using the off-network link and, after receipt, the network device connects to the network using the network credentials (1629). If there is another network device (1633), another off-network link is established with the next network device (1437). If authorization has been granted for sharing the network credentials (1641), the network credentials are retrieved from memory and transmitted to the next network device using the off-network link (1645) to allow it to connect to the network (1629). Advantageously, this embodiment requires only a single entry of network credentials, which are stored in a memory device and retrieved each time a new network device is to be added to the network, minimizing notifications and input required from a user. If authorization was withheld, the list of networks detected by the new network device can be displayed (1609) for repeating the process.

Figure 17:
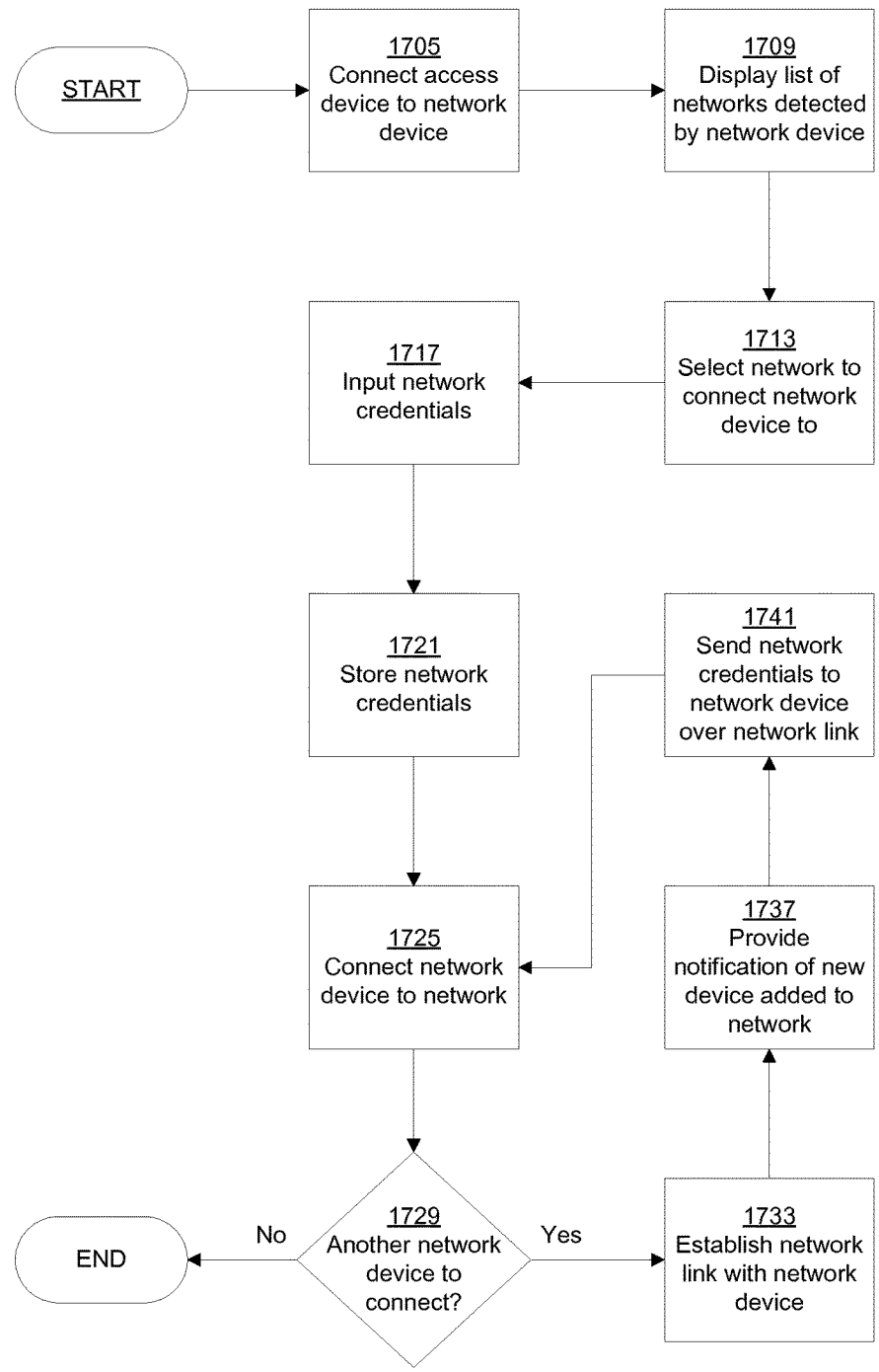
FIG. 17 provides an overview of a method for connecting network devices to a network, in accordance with some embodiments.

FIG. 17 provides an overview of another method embodiment for establishing a local area network, such as local area network 1500. In this embodiment, the network credentials are automatically shared with new devices with notification provided of adding new devices to the network. First, the access device is connected to a network device to be added to the local area network (1705) to allow communication between the access device and a network device using an off-network link. The access device then displays a list of network detected by the network device (1709), upon which the desired network is selected (1713). The network credentials are then input (1717), and stored (1721). The network credentials are then transmitted to the network device using the off-network link and, after receipt, the network device connects to the network using the network credentials (1725). If there is another network device (1729), another off-network link is established with the next network device (1733). A notification is then generated to inform that the new network device is being added to the network (1737) the network credentials are retrieved from memory and transmitted to the next network device using the off-network link (1741) to allow it to connect to the network (1725). Advantageously, this embodiment requires only a single entry of network credentials, which are stored in a memory device and retrieved each time a new network device is to be added to the network, while keeping the user informed of additional networks devices that are added to the network.

Figure 18:
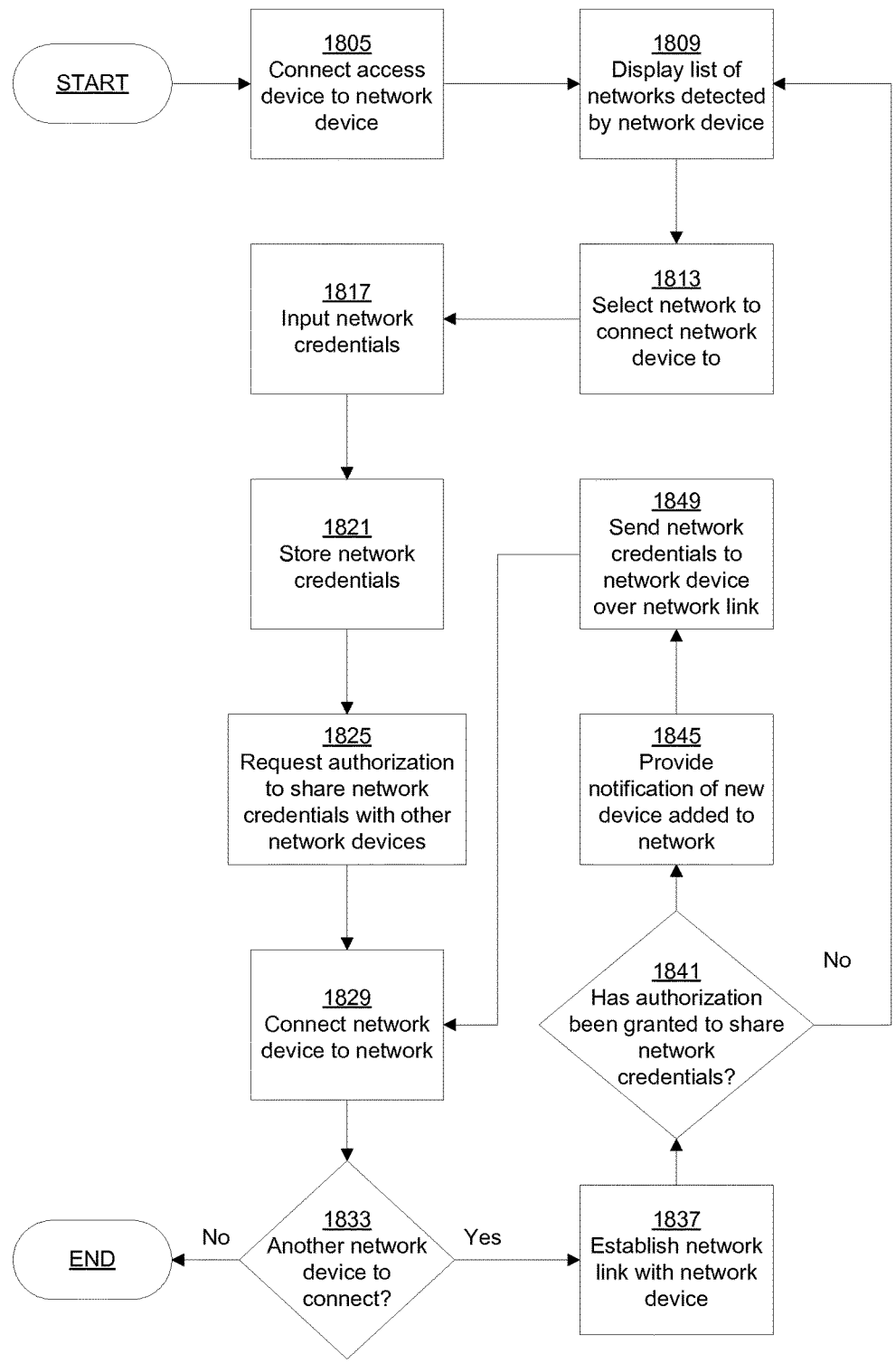
FIG. 18 provides an overview of a method for connecting network devices to a network, in accordance with some embodiments.

FIG. 18 provides an overview of another method embodiment for establishing a local area network, such as local area network 1500. In this embodiment, the network credentials are automatically shared with new devices if authorization to do so is granted, with notification provided of adding new devices to the network. First, the access device is connected to a network device to be added to the local area network (1805) to allow communication between the access device and a network device using an off-network link. The access device then displays a list of network detected by the network device (1809), upon which the desired network is selected (1813). The network credentials are then input (1817), and stored (1821). Authorization is requested for sharing the network credentials with one or more network devices (1825). The network credentials are then transmitted to the network device using the off-network link and, after receipt, the network device connects to the network using the network credentials (1829). If there is another network device (1833), another off-network link is established with the next network device (1837). If authorization has been granted for sharing the network credentials (1841), a notification is generated to inform that the new network device is being added to the network (1845). The network credentials are retrieved from memory and transmitted to the next network device using the off-network link (1849) to allow it to connect to the network (1829). Advantageously, this embodiment requires only a single entry of network credentials, which are stored in a memory device and retrieved each time a new network device is to be added to the network, while giving the user control over sharing of the network credentials and keeping the user informed of additional networks devices that are added to the network.

Figure 19:
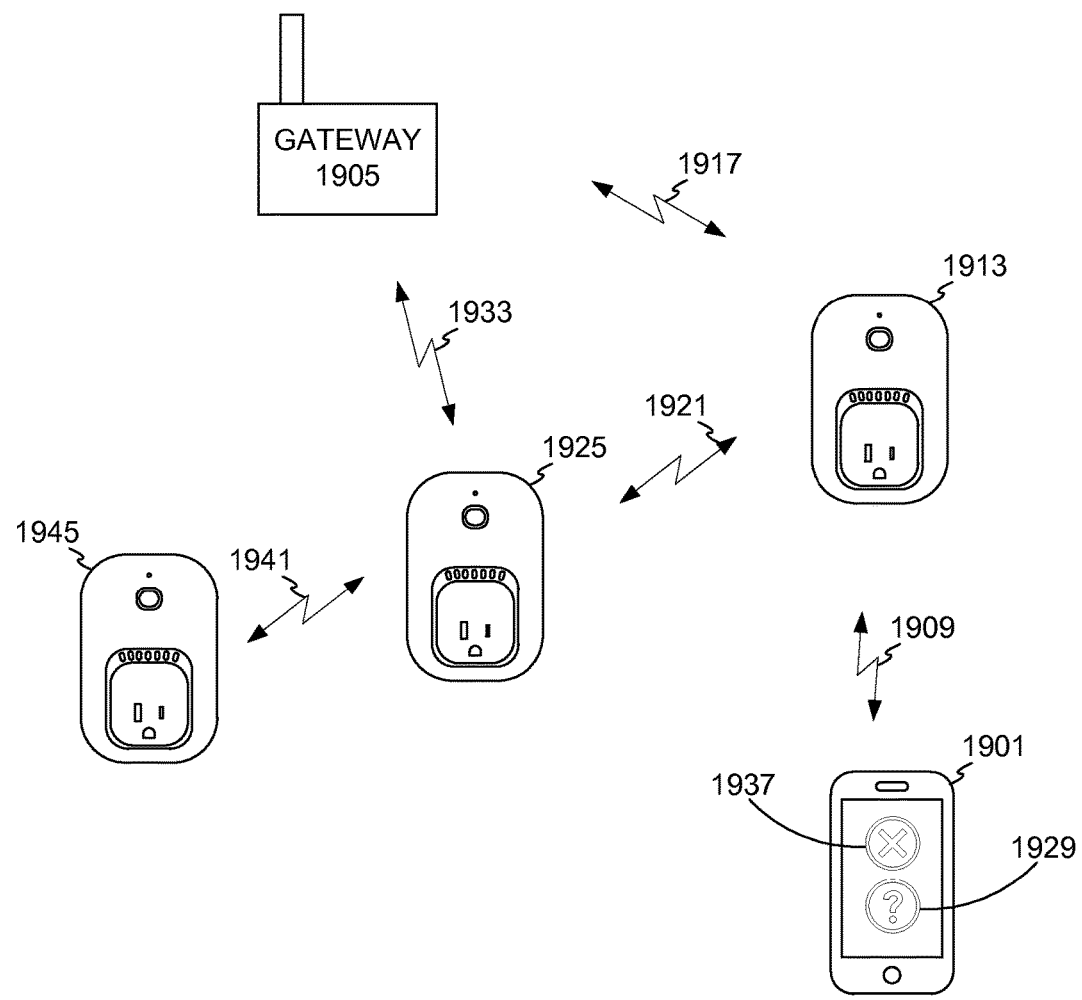
FIG. 19 is an illustration of an example of a network environment, in accordance with some embodiments.

FIG. 19 illustrates an example embodiment of a local area network 1900. Here, an access device 1901 connects to network device 1913 over off-network wireless link 1909. If the network credentials for connection to gateway 1905 are stored by or accessible to access device 1901, they are optionally passed to network device 1913 over off-network wireless link 1909, if so authorized. If the network credentials for connection to gateway 1905 are not stored by or accessible to access device 1901 or sharing is not authorized, a user can enter the network credentials, which are then passed to network device 1913 over wireless link 1909 and optionally stored. After receiving the network credentials, network device 1913 establishes a wireless connection 1917 with gateway 1905. In the embodiment shown, for adding network device 1925 to local area network 1900, an off-network wireless link 1921 is established between network device 1913 and network device 1925, and a notification 1929 is generated and displayed on access device 1901, such as to request authorization to share the stored network credentials with network device 1925. An additional notification 1937 is displayed, allowing revocation of the authorization for sharing the network credentials. After the stored network credentials are transmitted to network device 1925 over off-network wireless link 1921, network device 1925 establishes wireless connection 1933 with gateway 1905. In the embodiment shown, for attempting to add network device 1941 to local area network 1900, an off-network wireless link 1937 is established with network device 1941, shown here as between network device 1941 and network device 1925. If authorization for sharing the network credentials has been revoked, network device 1945 is unable to establish a wireless connection with gateway 1905, absent additional authorization or input of the network credentials. Advantageously, this allows for selective authorization and control over sharing of the network credentials in a way that can maximize security.

Figure 20:
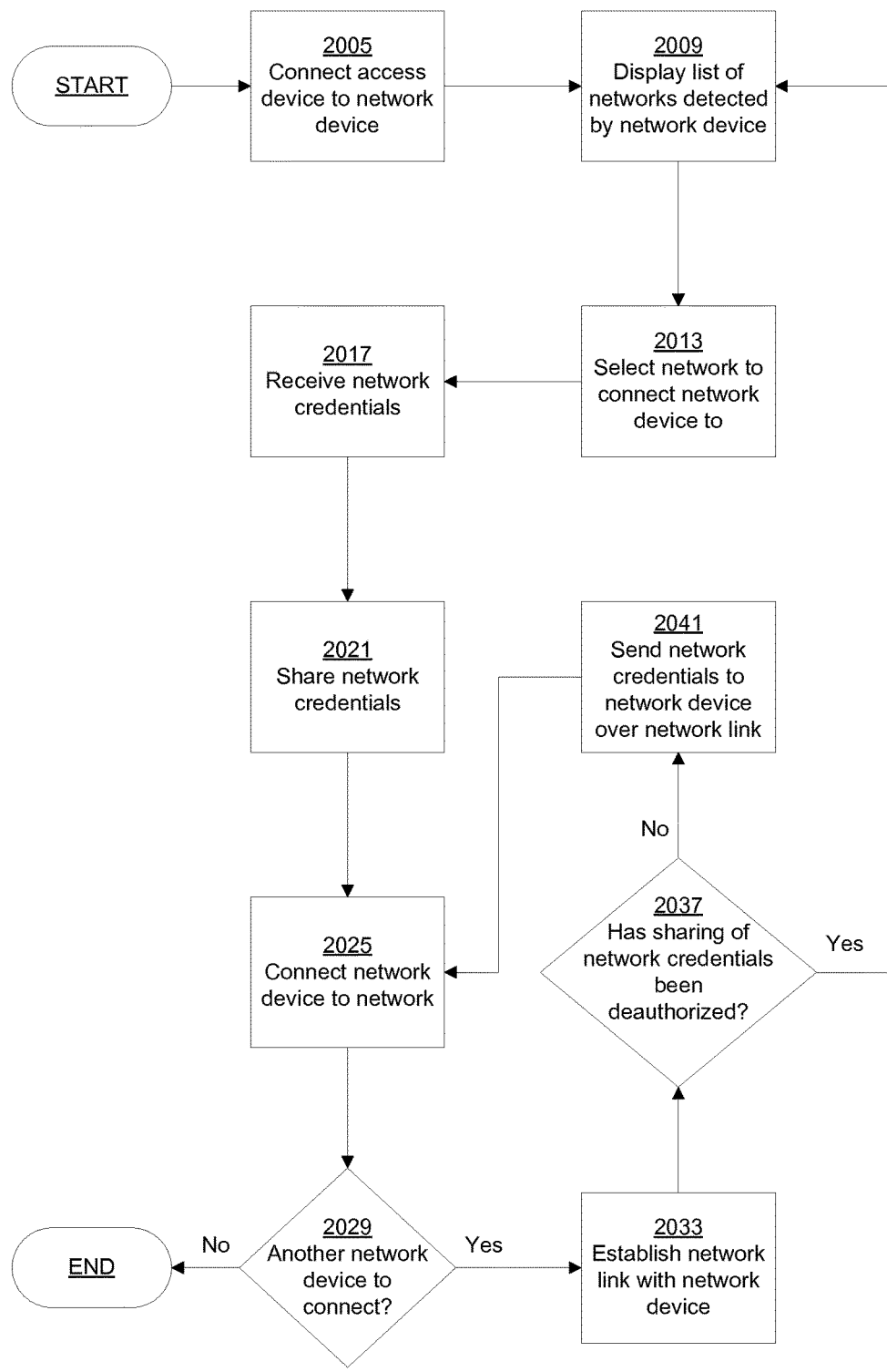
FIG. 20 provides an overview of a method for connecting network devices to a network, in accordance with some embodiments.

FIG. 20 provides an overview of another method embodiment for establishing a local area network, such as local area network 1900. In this embodiment, the network credentials are automatically shared unless authorization to do so has been revoked. First, the access device is connected to a network device to be added to the local area network (2005) to allow communication between the access device and the network device using an off-network link. The access device then displays a list of network detected by the network device (2009), upon which the desired network is selected (2013). The network credentials are then received (2017), and stored (2021). The network credentials are then transmitted to the network device using the off-network link and, after receipt, the network device connects to the network using the network credentials (2025). If there is another network device (2029), another off-network link is established with the next network device (2033). If authorization to share the network credentials has been revoked (2037), the list of networks detected by the next network device can be displayed (2009) for repeating the process. If authorization to share the network credentials has not been deauthorized (2037), the network credentials are retrieved from memory and transmitted to the next network device using the off-network link (2041) to allow it to connect to the network (2025). Advantageously, this embodiment requires only a single entry of network credentials, which are stored in a memory device and retrieved each time a new network device is to be added to the network, minimizing notifications and input required from a user, while giving the user control over the sharing of network credentials by deauthorizing, such as a general deauthorization, a deauthorization of specific devices or classes of devices and the like.

Figure 21:
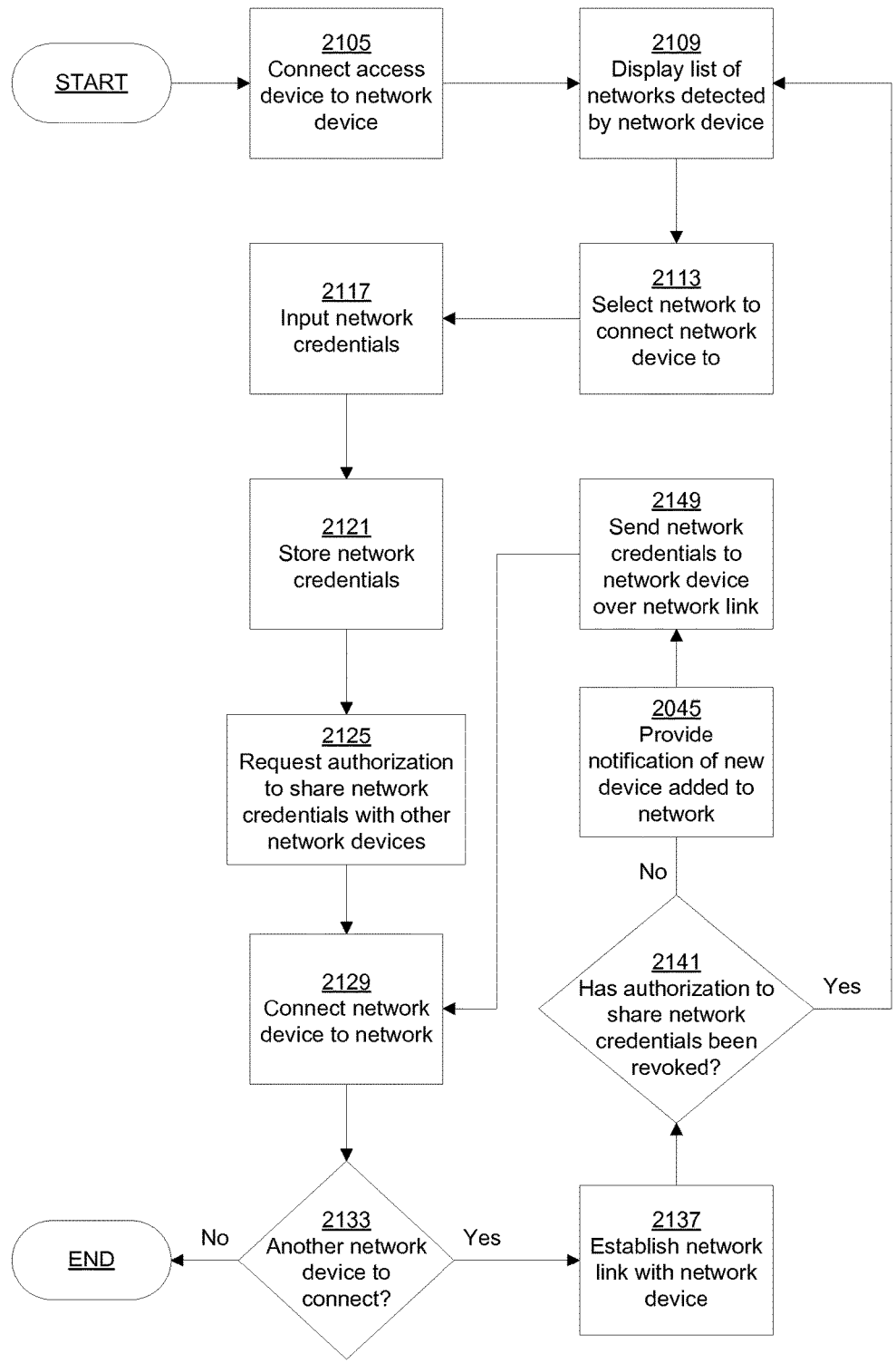
FIG. 21 provides an overview of a method for connecting network devices to a network, in accordance with some embodiments.

FIG. 21 provides an overview of another method embodiment for establishing a local area network, such as local area network 1900. In this embodiment, the network credentials are automatically shared unless authorization to do so has been revoked, with notification of sharing provided to the user. First, the access device is connected to a network device to be added to the local area network (2105) to allow communication between the access device and the network device using an off-network link. The access device then displays a list of network detected by the network device (2109), upon which the desired network is selected (2113). The network credentials are then input and received (2117), and stored (2121), and authorization is requested for sharing the network credentials with other devices (2125). The network credentials are then transmitted to the network device using the off-network link and, after receipt, the network device connects to the network using the network credentials (2129). If there is another network device (2133), another off-network link is established with the next network device (2137). If authorization to share the network credentials has been revoked (2141), the list of networks detected by the next network device can be displayed (2109) for repeating the process. If authorization to share the network credentials has not been deauthorized (2141), a notification is generated (2045) and the network credentials are retrieved from memory and transmitted to the next network device using the off-network link (2149) to allow it to connect to the network (2129). Advantageously, this embodiment requires only a single entry of network credentials, which are stored in a memory device and retrieved each time a new network device is to be added to the network, minimizing input required from a user, while keeping the user informed of sharing of the network credentials and giving the user control over the sharing of the network credentials by deauthorizing, such as a general deauthorization, a deauthorization of specific devices or classes of devices and the like.

Figure 22:
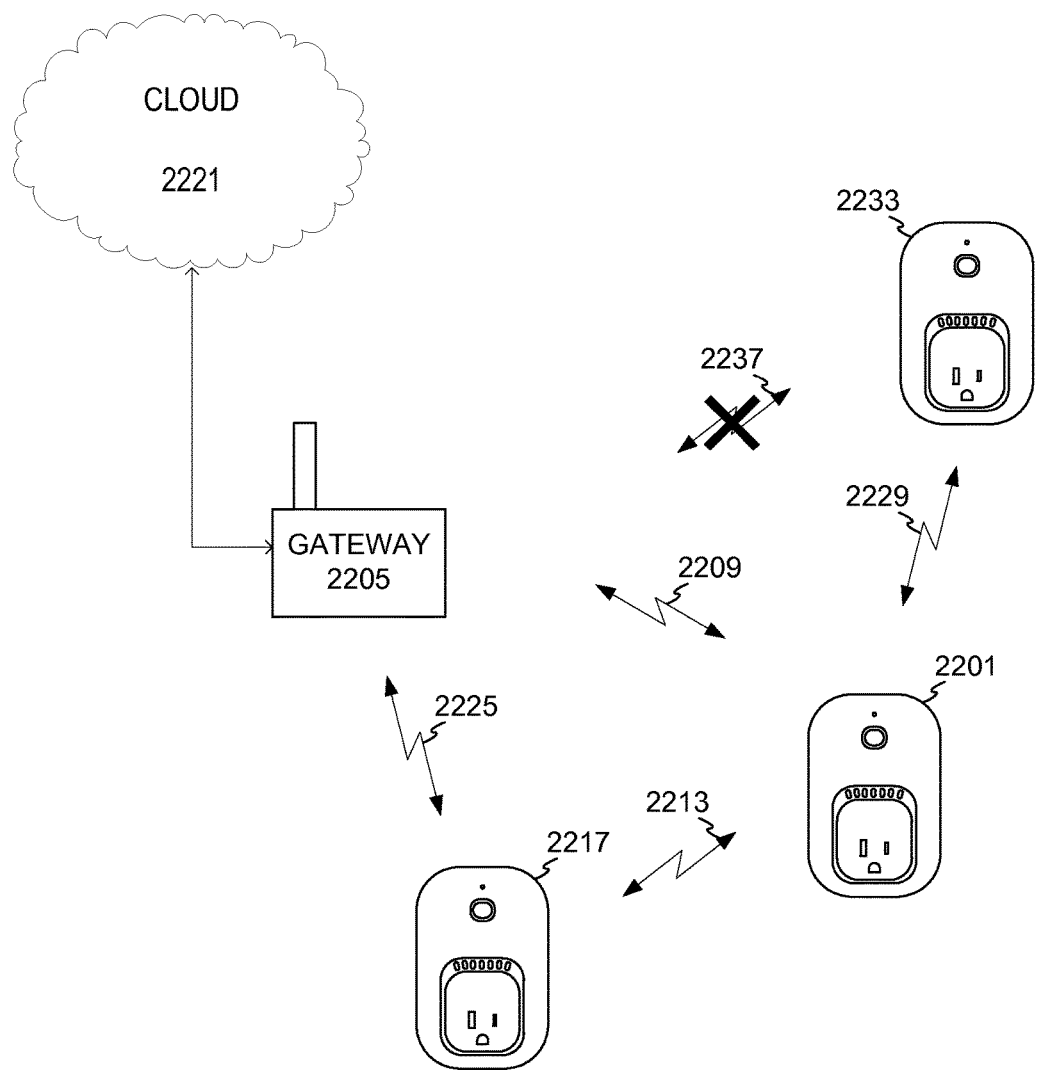
FIG. 22 is an illustration of an example of a network environment, in accordance with some embodiments.

FIG. 22 illustrates an example embodiment of a local area network 2200. Here, a network device 2201 is connected no network gateway 2205 over network connection 2209. Network device 2201 optionally stores the network credentials for connecting to the local area network 2200 and gateway 2205. When it is desired to add a new network device 2217 to the local area network, a wireless link 2213 is established with network device 2201. Information identifying network device 2217 can be transmitted to network device 2201 over wireless link 2213, such as serial number information, a device manufacturer, a security code, a unique device identifier, etc. Network device 2201 can compare the information identifying network device 2217 with reference information or alternatively transmit the information identifying network device 2217 to a server located in cloud 2221 for verification of the identity of network device 2217. Upon verification of the identity of network device 2217, the network credentials are transmitted to network device 2217 over wireless link 2213, after which network device 2217 can establish wireless connection 2225 with gateway 2205 using the network credentials. If it is desired to add network device 2233 to the local area network, a wireless link 2229 is established with network device 2201. Information identifying network device 2233 can be transmitted to network device 2201 over wireless link 2229, such as serial number information, a device manufacturer, a security code, a unique device identifier, etc. Network device 2201 can compare the information identifying network device 2233 with reference information or alternatively transmit the information identifying network device 2233 to a server located in cloud 2221 for verification of the identity of network device 2233. If the identity of network device 2233 cannot be verified, the network credentials are withheld from network device 2233, thus preventing network device 2233 from establishing wireless connection 2237 with gateway 2205 without further verification, authorization or input from a user. Optionally, a user can manually provide identity verification for network device 2233, allowing the sharing of the security credentials with network device 2233.

Figure 23:
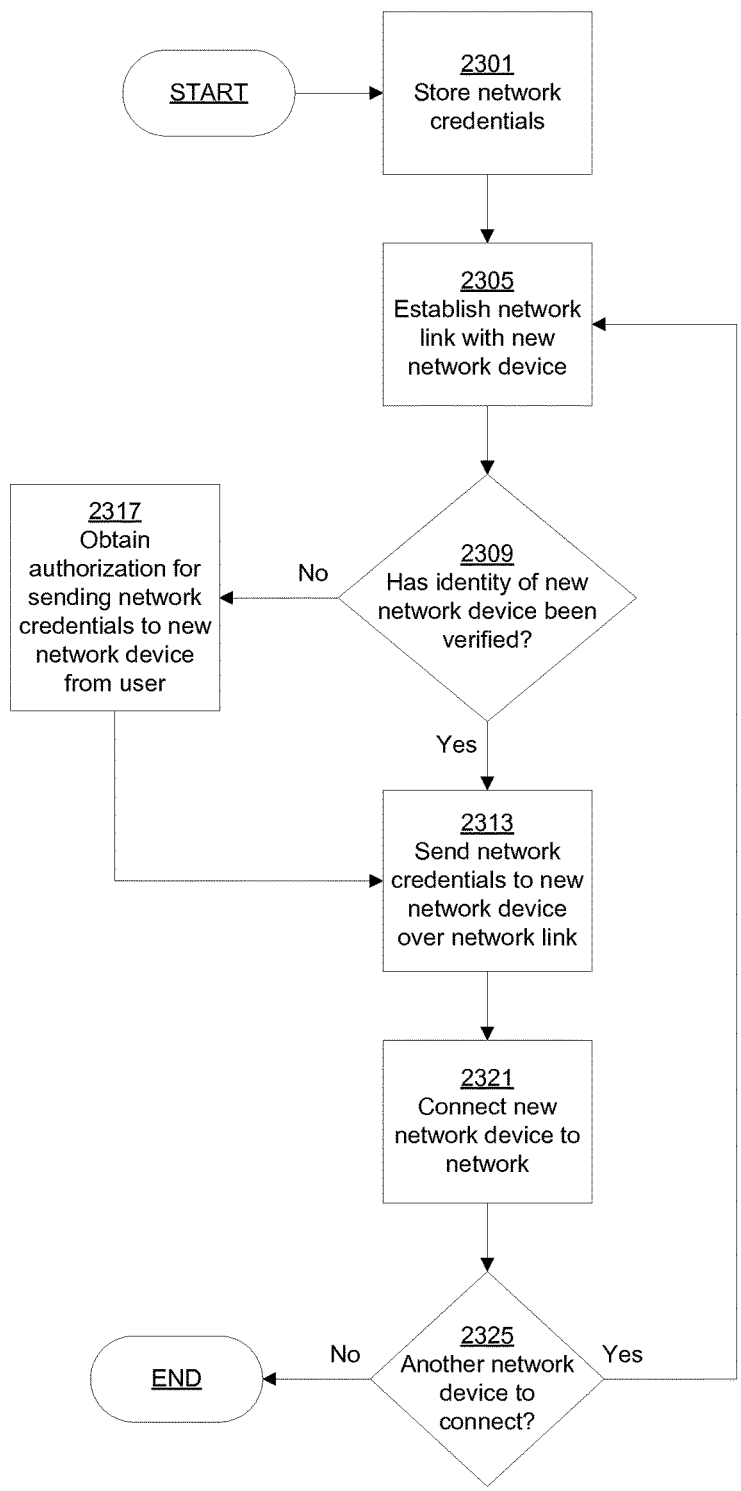
FIG. 23 provides an overview of a method for connecting network devices to a network, in accordance with some embodiments.

FIG. 23 provides an overview of another method embodiment for establishing a local area network, such as local area network 2200. Initially, the network credentials are stored (2301), such as by a network device, an access device, a cloud server, etc. A network link is established with a new network device to be added to the local area network (2305), such as to allow off-network communication with the new network device. If the identity of the new network device is verified (2309), the network credentials are sent to the new network device over the network link (2313). If the identity of the new network device is not automatically verified, authorization for sending the network credentials to the new network device can be obtained from a user (2317), to allow sending the network credentials to the new network device using the network link (2313). Once the network credentials are sent to the new network device, the new network device can connect to the network (2321). If there is another new network device to connect to the network (2325), a network link can be established with the next new network device (2305), for repeating the identity verification. This embodiment advantageously allows further security measures and simplification of connection of new devices to a secured network, by allowing a device manufacturer to pre-authorize sharing of network credentials and/or to validate the identity of a new device prior to sharing the network credentials.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
    receiving, at a computing device, input corresponding to determination of network credentials for connecting wireless client devices to a wireless network gateway;
    establishing, using the network credentials, a wireless network connection between the computing device and the wireless network gateway, wherein the computing device is a wireless client device;
    storing the network credentials;
    establishing a direct wireless communications link between the computing device and a new wireless client device for exchanging data directly between the computing device and the new wireless client device;
    transmitting, by the computing device, the network credentials after establishing the direct wireless communications link, wherein transmitting includes using the direct wireless communications link, and wherein receiving the network credentials at the new wireless client device authorizes the new wireless client device to automatically retransmit the network credentials to additional new wireless client devices;
    receiving, by the computing device, data indicating that the network credentials have been automatically retransmitted to an additional new wireless client device; and
    generating, by the computing device, a notification indicating that the network credentials have been automatically retransmitted to the additional new wireless client device.

2. The method of claim 1, wherein the computing device includes non-transitory memory, wherein the network credentials are stored in the non-transitory memory and wherein transmitting includes transmitting the stored network credentials from the non-transitory memory.

3. The method of claim 1, further comprising:
    determining a location where the network credentials are stored, wherein transmitting the network credentials includes facilitating communication from the location where the network credentials are stored.

4. The method of claim 1, further comprising:
    generating an authorization notification on the computing device, wherein the authorization notification requests authorization for transmitting the network credentials to the new wireless client device.

5. The method of claim 1, further comprising: detecting input, at the computing device, the input corresponding to authorization for transmitting the network credentials to the new wireless client device.

6. The method of claim 5, wherein the authorization for transmitting the network credentials to the new wireless client device permits automatic retransmission of the network credentials by the new wireless client device to additional new wireless client devices.

7. The method of claim 1, further comprising:
    verifying the new wireless client device prior to transmitting the network credentials, wherein verifying includes detecting additional input associated with an access device, wherein the additional input corresponds to verification of the new wireless client device.

8. The method of claim 1, further comprising:
    verifying the new wireless client device prior to transmitting the network credentials, wherein verifying includes receiving, using the direct wireless communications link, a device identifier for the new wireless client device or a security key for the new wireless client device.

9. The method of claim 1, wherein the network credentials correspond to updated network credentials for connecting wireless client devices to the wireless network gateway after a security setting change, and wherein transmitting the network credentials facilitates providing the updated network credentials to one or more wireless client devices associated with the wireless network gateway.

10. A system, comprising:
one or more data processors; and
a non-transitory computer-readable storage medium containing instructions, which when executed on the one or more data processors, cause the one or more data processors to perform operations including:
receiving, at a wireless client device, input corresponding to determination of network credentials for connecting wireless client devices to a wireless network gateway;
establishing, using the network credentials, a wireless network connection between the wireless client device and the wireless network gateway;
storing the network credentials;
establishing a direct wireless communications link between the wireless client device and a new wireless client device for exchanging data directly between the wireless client device and the new wireless client device;
transmitting the network credentials after establishing the direct wireless communications link, wherein transmitting includes using the direct wireless communications link, and wherein receiving the network credentials at the new wireless client device authorizes the new wireless client device to automatically transmit the network credentials to additional new wireless client devices;
receiving data indicating that the network credentials have been automatically transmitted to an additional new wireless client device; and
generating a notification indicating that the network credentials have been automatically transmitted to the additional new wireless client device.

11. The system of claim 10, wherein the system further comprises:
non-transitory memory, wherein storing the network credentials includes storing the network credentials in the non-transitory memory, and wherein transmitting includes transmitting the stored network credentials from the non-transitory memory.

12. The system of claim 10, the operations further comprising:
determining a location where the network credentials are stored, wherein transmitting the network credentials includes facilitating communication from the location where the network credentials are stored.

13. The system of claim 10, the operations further comprising:
generating an authorization notification, wherein the authorization notification requests authorization for transmitting the network credentials to the new wireless client device.

14. The system of claim 10, the operations further comprising:
detecting input corresponding to authorization for transmitting the network credentials to the new wireless client device.

15. The system of claim 14, wherein the authorization for transmitting the network credentials permits automatic retransmission of the network credentials by the new wireless client device to additional new wireless client devices.

16. The system of claim 10, the operations further comprising:
verifying the new wireless client device prior to transmitting the network credentials, wherein verifying includes detecting additional input associated with an access device, wherein the additional input corresponds to verification of the new wireless client device.

17. The system of claim 10, the operations further comprising:
verifying the new wireless client device, wherein verifying includes receiving, using the direct wireless communications link, a device identifier for the new wireless client device or a security key for the new wireless client device.

18. The system of claim 10, wherein the network credentials correspond to updated network credentials for connecting wireless client devices to the wireless network gateway after a security setting change, and wherein transmitting the network credentials facilitates providing the updated network credentials to one or more wireless client devices associated with the wireless network gateway.

19. A computer-program product, tangibly embodied in a non-transitory machine-readable storage medium, comprising instructions configured to cause a computing device to perform operations including:
receiving, at the computing device, input corresponding to determination of network credentials for connecting wireless client devices to a wireless network gateway;
establishing, using the network credentials, a wireless network connection between the computing device and the wireless network gateway, wherein the computing device is a wireless client device;
storing the network credentials;
establishing a direct wireless communications link between the computing device and a new wireless client device for exchanging data directly between the computing device and the new wireless client device;
transmitting, by the computing device, the network credentials after establishing the direct wireless communications link, wherein transmitting includes using the direct wireless communications link, and wherein receiving the network credentials at the new wireless client device authorizes the new wireless client device to automatically retransmit the network credentials to additional new wireless client devices;
receiving, by the computing device, data indicating that the network credentials have been automatically retransmitted to an additional new wireless client device; and
generating, by the computing device, a notification indicating that the network credentials have been automatically retransmitted to the additional new wireless client device.

20. The computer-program product of claim 19, wherein the computing device includes non-transitory memory, wherein storing the network credentials includes storing the network credentials in the non-transitory memory, and wherein transmitting includes transmitting the stored network credentials from the non-transitory memory.

21. The computer-program product of claim 19, wherein the operations further include:
determining a location where the network credentials are stored, wherein transmitting the network credentials includes facilitating communication from the location where the network credentials are stored.

22. The computer-program product of claim 19, wherein the operations further include:
  generating an authorization notification, wherein the authorization notification requests authorization for transmitting the network credentials to the new wireless client device.

23. The computer-program product of claim 19, wherein the operations further include:
  detecting input, at the computing device, the input corresponding to authorization for transmitting the network credentials to the new wireless client device.

24. The computer-program product of claim 23, wherein authorization for transmitting the network credentials to the new wireless client device permits automatic retransmission of the network credentials by the new wireless client device to additional new wireless client devices.

25. The computer-program product of claim 23, wherein the operations further include:
  verifying the new wireless client device prior to transmitting the network credentials, wherein verifying includes detecting additional input associated with an access device, wherein the additional input corresponds to verification of the new wireless client device.

26. The computer-program product of claim 23, wherein the operations further include:
  verifying the new wireless client device prior to transmitting the network credentials, wherein verifying includes receiving, using the direct wireless communications link, a device identifier for the new wireless client device or a security key for the new wireless client device.

27. The computer-program product of claim 19, wherein the network credentials correspond to updated network credentials for connecting wireless client devices to the wireless network gateway after a security setting change, and wherein transmitting the network credentials facilitates providing the updated network credentials to one or more wireless client devices associated with the wireless network gateway.

28. A computer implemented method, comprising:
  receiving, at a computing device, initial network credentials for connecting wireless client devices to a wireless network gateway;
  establishing, using the initial network credentials, a wireless network connection between the computing device and the wireless network gateway;
  storing the initial network credentials;
  establishing a first direct wireless communications link between the computing device and a new wireless client device, wherein direct wireless communications links facilitate exchanging data directly between two devices;
  transmitting, by the computing device, the initial network credentials, wherein the initial network credentials are transmitted using the first direct wireless communications link, wherein receiving the initial network credentials facilitates storing the initial network credentials at a wireless client device;
  receiving, at the computing device, updated network credentials, wherein the updated network credentials correspond to a change in network credentials for the wireless network gateway from the initial network credentials to the updated network credentials;
  establishing a second direct wireless communications link between the computing device and the new wireless client device; and
  transmitting, by the computing device, the updated network credentials, wherein the updated network credentials are transmitted using the second direct wireless communications link, and wherein receiving the updated network credentials at the new wireless client device facilitates automatic retransmission of the updated network credentials to an additional wireless client device storing the initial network credentials.

29. The method of claim 28, wherein automatic retransmission of the updated network credentials facilitates automatic continued connection to the wireless network gateway by the new wireless client device and the additional wireless client device.

30. The method of claim 28, wherein receiving the updated network credentials occurs prior to changing network credentials for the wireless network gateway from the initial network credentials to the updated network credentials.

* * * * *